(12) United States Patent
Wolf et al.

(10) Patent No.: US 11,702,050 B2
(45) Date of Patent: Jul. 18, 2023

(54) BRAKE CONTROL SYSTEM

(71) Applicant: Westinghouse Air Brake Technologies Corporation, Wilmerding, PA (US)

(72) Inventors: Charles L. Wolf, Olney, MD (US); Wynand Jacobus Coetzee Jordaan, Karratha (AU)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 734 days.

(21) Appl. No.: 16/725,232

(22) Filed: Dec. 23, 2019

(65) Prior Publication Data

US 2020/0130658 A1 Apr. 30, 2020

Related U.S. Application Data

(63) Continuation-in-part of application No. PCT/US2017/039995, filed on Jun. 29, 2017.

(51) Int. Cl.
| | |
|---|---|
| *B60L 3/00* | (2019.01) |
| *B60T 8/17* | (2006.01) |
| *B61H 13/34* | (2006.01) |
| *B65G 67/24* | (2006.01) |
| *B60T 8/18* | (2006.01) |
| *B60T 8/172* | (2006.01) |

(52) U.S. Cl.
CPC ............ *B60T 8/1705* (2013.01); *B60T 8/172* (2013.01); *B60T 8/1893* (2013.01); *B61H 13/34* (2013.01); *B65G 67/24* (2013.01)

(58) Field of Classification Search
CPC ...... B60T 8/1705; B60T 8/172; B60T 8/1893; B60T 13/665; B60T 17/228; B61H 13/34; B65G 67/24; B60L 3/00

USPC .......................................................... 701/19
See application file for complete search history.

(56) References Cited

U.S. PATENT DOCUMENTS 5,174,212 A * 12/1992 Judy ......................... B61J 3/06
104/162
6,401,015 B1 * 6/2002 Stewart ................. B60T 17/228
701/19

(Continued)

OTHER PUBLICATIONS

Examination report No. 2 dated Feb. 16, 2021 for corresponding Australian application No. 2017420737 (4 pages).

(Continued)

*Primary Examiner* — Shardul D Patel
(74) *Attorney, Agent, or Firm* — The Small Patent Law Group LLC; Josef L. Hoffmann

(57) ABSTRACT

Disclosed is a method, system, and computer readable medium including program instructions for controlling the braking of one or more vehicles in a vehicle system positioned for unloading/loading of cargo. The vehicle system includes a designated head-end and a tail-end and each of the one or more vehicles is equipped with an electronic braking system in communication with a central control via a communication network spanning across the vehicle system. A dynamic unloading/loading braking profile can be set on at least one electronic braking system on at least one vehicle. During unloading/loading of the cargo from one or more vehicles in the vehicle system, the braking on at least one of the vehicles in the vehicle system is controlled via the dynamic unloading/loading braking profile.

20 Claims, 11 Drawing Sheets

(56) References Cited

U.S. PATENT DOCUMENTS

| | | | | |
|---|---|---|---|---|
| 6,435,623 | B1* | 8/2002 | Peltz | B60T 13/665 303/3 |
| 6,435,624 | B1* | 8/2002 | Kull | B60T 13/665 303/3 |
| 7,395,141 | B1* | 7/2008 | Seek | B61C 17/12 701/19 |
| 2003/0205164 | A1* | 11/2003 | Engle | B61H 13/005 105/404 |
| 2005/0001471 | A1* | 1/2005 | Hart | B60T 17/228 303/3 |
| 2006/0076826 | A1* | 4/2006 | Kane | B60T 17/228 303/7 |
| 2007/0096548 | A1* | 5/2007 | Anstey | B60T 13/66 303/7 |
| 2008/0149781 | A1* | 6/2008 | Root | B60T 17/228 246/167 R |
| 2013/0179048 | A1* | 7/2013 | Moffitt | B60T 13/665 701/70 |
| 2014/0032023 | A1* | 1/2014 | Kumar | B60W 40/105 701/93 |
| 2014/0081487 | A1* | 3/2014 | Wolf | B60T 13/665 701/19 |
| 2014/0252174 | A1* | 9/2014 | Melas | B61C 17/12 246/187 A |
| 2015/0158507 | A1* | 6/2015 | Flamanc | B61F 9/00 104/242 |
| 2015/0367862 | A1* | 12/2015 | Ledbetter | B61H 9/006 701/19 |
| 2017/0253228 | A1* | 9/2017 | Naylor | B60T 7/124 |

OTHER PUBLICATIONS

Examination report No. 1 dated Oct. 29, 2020 for corresponding Australian application No. 2017420737 (5 pages).

International Preliminary Report on Patentability for corresponding International Application No. PCT/US2017/039995 dated Jan. 9, 2020. (9 pages).

Professor Peter Wolfs and Dr. Peter Thomas, "Wheel Speed, Wheel Slip and True Ground Speed Detection Options for Brake Vans", Central Queensland University, Centre for Railway Engineering, Sep. 23, 2005, 13 pages.

Bendix "Electronic Brake Wear Sensor", https://www.bendix.com.au/content/electronic-brake-wear-sensors, 2 pages. Printed Sep. 19, 2017.

Amir Shamdani "Optimization of Production Throughput for Heavy Haul Trains in a Car Dumper", IHHA Jun. 2015 abstract, 1 page.

International Search Report for related PCT Application No. PCT/US2017/03999 dated Oct. 30, 2017, 4 pages.

Written Opinion for related PCT Application No. PCT/US2017/03999 dated Oct. 30, 2017, 7 pages.

* cited by examiner

FIG. 4

BRAKE CONTROL SYSTEM

CROSS-REFERENCE TO RELATED APPLICATIONS

This application is a continuation-in-part of International Patent Application No. PCT/US2017/039995, which was filed on 29 Jun. 2017, and the entire disclosure of which is incorporated herein by reference.

BACKGROUND

Technical Field

The subject matter described herein relates to a brake control system and method.

Description of Art

A traditional train braking system uses pneumatic valves to control and generate brake applications on the rail cars along the length of the train. In general, this traditional system consists of a brake pipe that runs the entire length of the train and which supplies air to air reservoirs mounted on each of the rail cars. When the engineer needs to make a brake application, control valves in the locomotive reduce the brake pipe air pressure. As the brake pipe pressure reduces, the service portion on each rail car divert air from their air reservoirs to their brake cylinders. This causes the brakes to become active. The engineer charges the brake pipe with air generated by the air compressor located in the locomotive to release the brakes.

One of the weakness of this air brake system is the reaction time. It can take up to two minutes or more for a brake application command to propagate from the locomotive to the tail end of a train. This results in rail cars applying brakes at different point in time. This uneven braking can cause significant forces to build up between the rail cars in a train.

In contrast, electronically controlled pneumatic (ECP) braking uses electronic controls which make it possible to activate air-powered brakes on the cars significantly faster and in a synchronous manner. On an ECP-equipped train, the rail cars are equipped with a trainline (a communication cable) that runs parallel to the brake pipe down the length of the train. This trainline is used to (a) supply power to the electronic components installed on the cars and (b) to send commands from the locomotive and receive feedback from the rail cars and an end of train (EOT) device.

ECP provides many benefits over the traditional braking system. For example, since all the cars receive the brake command at the same time, the brakes are applied uniformly and substantially instantaneously. This provides much better train braking control, shortens the stopping distance, and leads to a lower risk of derailment or of coupling breakage. Further, since the cars can also send their status to the locomotive at the front, the engineer can monitor the state of the train and know at any given time the braking capabilities available.

During typical operation, the ECP brakes on a train are required to be operated in accordance with an ECP braking mode of operation governed by the Association of American Railroads (AAR)S-4200 standard braking requirements. In accordance with the S-4200 standard, the brakes of all of the rail cars of the train are controlled during operation of the train to the same percentage of braking during braking operations of the train.

For example, in accordance with the S-4200 standard, a head end unit (HEU) in the train locomotive can output a braking command on a trainline, e.g., a 30% braking command, which braking command is received by a controller of each rail car of the train communicatively coupled to the trainline. In response to receiving this braking command, the controller of each rail car causes its brakes to be set to the commanded value, in this example 30% of full braking. In this manner, the brakes of all of the cars of the train can be commanded to be set to the same percentage or level of braking at the same time, thereby reducing and/or minimizing the levels of in-train forces on the couplers of the train that are used to connect the locomotive and the rail cars of the train that would appear on the couplers if the brakes of the rail cars were applied at different times.

In contrast to the ECP braking mode in accordance with the S-4200 standard used during normal operation of the train, during indexed or stepped movement of the train during, for example, unloading/loading operations of the rail cars of the train, the ECP braking mode in accordance with the S-4200 standard is disabled, whereupon the brakes of the rail cars are completely released, and all movement and stops of the rail cars are controlled by an external movement means, e.g., an indexer, which indexes or steps all the rail cars in one or more discrete increments.

Such indexed or stepped movement of the rail cars, however, has been observed to produce undesirable levels of in-train forces and wear on the couplers of the train due to the indexed or stepped starting and stopping of the train during, for example, an unloading/loading operation.

It would, therefore, be desirable to provide a new braking solution for specific operating conditions such as loading or unloading of cargo from a train that overcomes as least some of the above challenges and makes the process of unloading/loading of rail cars more efficient.

BRIEF SUMMARY

In one embodiment, a method includes determining a first dynamic braking profile for at least one electronic braking system of at least one non-propulsion-generating vehicle in a vehicle system and performing one or more of unloading cargo from or loading the cargo onto the at least one non-propulsion-generating in the vehicle system while controlling braking on at least one other non-propulsion-generating in the vehicle system via the first dynamic braking profile.

In one embodiment, a system includes a control unit configured to determine a first dynamic braking profile for at least one electronic braking system of at least one non-propulsion-generating vehicle in a vehicle system. The control unit is configured to remotely control at least one brake controller of the at least one non-propulsion-generating vehicle in the vehicle system during one or more of unloading cargo from or loading the cargo onto the at least one non-propulsion-generating in the vehicle system while controlling braking on at least one other non-propulsion-generating in the vehicle system via the first dynamic braking profile.

In one embodiment, a system includes a control unit configured to communicate with brake controllers disposed onboard different vehicles of a vehicle system formed from the vehicles. Each of the brake controllers is configured to control an amount of braking imparted by a different vehicle of the vehicles in the vehicle system. The controller unit is configured to select different groups of the vehicles and to determine a different braking profile for each of the different groups. The braking profile for each of the groups indicating the amount of braking to be imparted by the vehicle or the vehicles for the corresponding group.

BRIEF DESCRIPTION OF THE DRAWINGS

FIGS. 3-7 are schematic illustrations of the sequential stepping or indexing of the vehicles of an example vehicle system through a stationary rotary dumper via an optional automated movement system;

DETAILED DESCRIPTION

Figure 1:
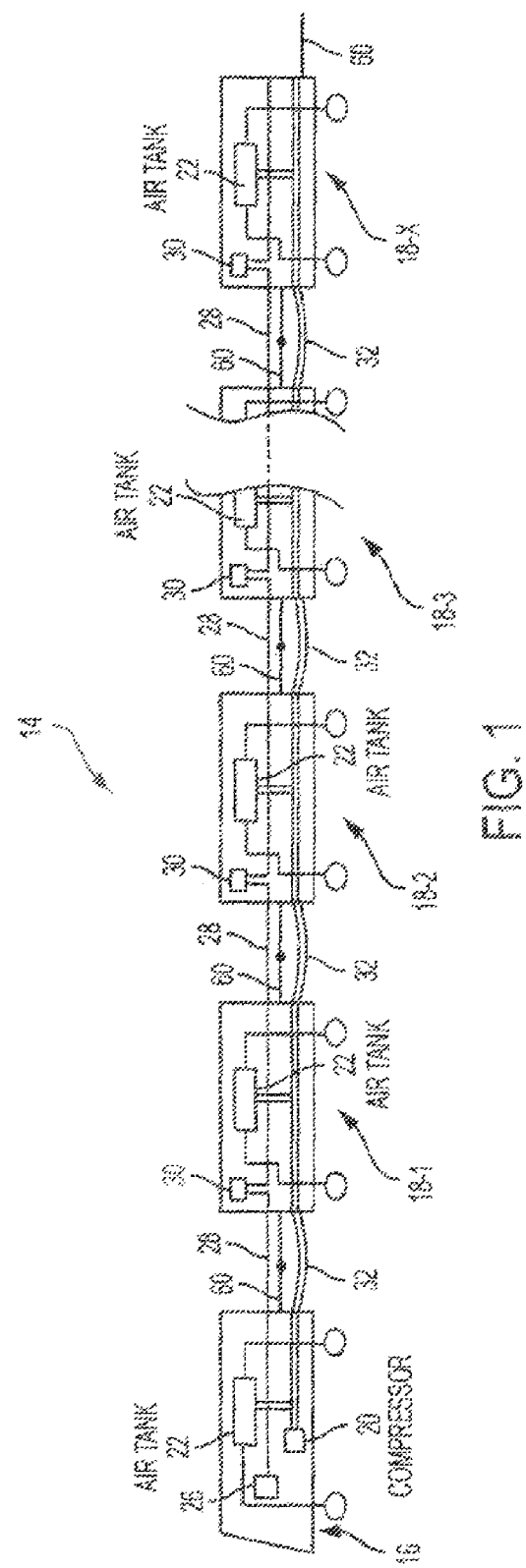
FIG. 1 is a schematic illustration of an example vehicle system that includes a propulsion-generating vehicle and non-propulsion-generating vehicles.

The subject matter described herein provides a brake control system, method, and computer-readable medium for controlling braking of one or more vehicles in a vehicle system. While some embodiments are described in connection with rail vehicles (such as trains, locomotives, and/or rail cars), not all embodiments are limited to rail vehicles. One or more embodiments of the inventive subject matter can be used in connection with other types of vehicle systems, such as automobiles, trucks, buses, mining vehicles, agricultural vehicles, other off-highway vehicles, or the like.

The subject matter described herein controls a vehicle system equipped with an individually addressable braking system. This individually addressable braking system or brake system can individually direct brakes in one or more vehicles to engage while the brakes in one or more other vehicles of the same vehicle system are engaged to a different amount or disengaged. One example of such a brake system includes an electronically controlled pneumatic (ECP) braking system. The system and method described herein can be used when the vehicle system is operating outside a main line, such as when the vehicle system is moved into a restricted area for storage, loading of cargo, unloading of cargo, maintenance, or the like (not for traveling to a starting location to a destination location of a trip). One particular instance of such an application is the process of loading or unloading of cargo from a vehicle system within a private yard of a customer or storage facility or delivery site.

According to one example, the system and method can control braking one or more vehicles (e.g., non-propulsion-generating vehicles, such as rail cars) in a vehicle system positioned for operation during an act of unloading/loading of cargo. The vehicle system can include a designated head-end and a tail-end. Each or at least one (but not all) of the vehicles in the vehicle system can be equipped with an electronic braking system having a communication link to a central control via a communication network spanning the vehicle system. A dynamic unloading/loading braking profile on at least one electronic braking system on at least one vehicle can be determined. The act of unloading/loading from one or more vehicles in the vehicle system can be performed while controlling the braking on at least one of the vehicles in the vehicle system via the dynamic unloading/loading braking profile.

The dynamic unloading/loading braking profile can allow the electronic braking systems on two or more of the vehicles in the vehicle system to be set to different braking values. The braking value of a braking system indicates or represents the amount of braking effort provided by that braking system. Greater braking values indicate that more braking effort is generated, while smaller braking values indicate less braking effort is generated.

The braking values set by the electronic braking systems on two or more of the vehicles can be different by an amount equal to or greater than 5% of the braking values. The percentage of braking value on each vehicle can be varied among the vehicles independent of the other vehicles in designated increments (e.g., in 1% increments between 0% braking value, or no braking (full brake release), 100% braking value (i.e., maximum service level braking), and 120% braking (i.e., emergency braking).

Information about the vehicle system can be stored at a first propulsion-generating vehicle (e.g., a locomotive, automobile, truck, or the like) connected to either the head-end or the tail-end of the vehicle system. The vehicle system can be positioned in a designated area for unloading/loading prior to start of the unloading/loading operation from the one or more vehicles in the vehicle system. The information about the vehicle system can be transferred or communicated between the first vehicle and a second propulsion-generating vehicle that will be coupled to the vehicle system in lieu of or as a replacement of the first vehicle. The second vehicle is connected to either the head-end or the tail-end of the vehicle system. The second vehicle is then configured to control the electronic braking systems in the one or more vehicles in the vehicle system.

The electronic braking system on at least one vehicle can be remotely controlled in coordination with operation of an automated movement system situated in proximity to the vehicle system. This remote control optionally can occur via the first vehicle or the second vehicle.

The electronic braking system in each of the vehicles can be allowed to continue to operate in the unloading/loading braking profile upon detecting a disruption in the communication network. Optionally, the electronic braking system in each of the vehicles can change to a full release condition (0% braking) upon detecting a disruption in the communication network.

A configuration of the electronic braking system in each vehicle can be altered to a dynamic unloading/loading braking profile. One or more groups of vehicles in the vehicle system can be selected and one or more dynamic unloading/loading operation braking profiles can be set or selected for the one or more groups. A continuous (or discrete) group of vehicles can be selected as the one or more groups.

At least one of a composition of the vehicles within the one or more groups and/or the unloading/loading braking profiles for one or more vehicles within each of the groups can be altered. For example, the vehicles associated with a group can be changed and/or the braking profile for a group can be changed. In an example, the dynamically altering of the composition and/or braking profiles can be based on the progression of the vehicle system through a loading/unloading process, upon changes to the loading/unloading system capability (for example, an indexer or rotary dumper operating at less than optimum performance), upon changes to the environment (for example, weather conditions including moisture, temperature, wind, etc.), and/or upon any other external change that can impact the loading/unloading process.

Movement of the vehicle system and the unloading/loading movement of an automated unloading/loading system can be synchronized with each other.

The braking status of two or more vehicles can be synchronized with each other based on movement of the vehicle system.

A standard, uniform, or default braking profile can be created in or for the electronic braking system for each of the vehicles upon completion of the act of unloading/loading of the vehicle system.

The vehicle system can be positioned in relation to an automated unloading/loading system. The positioning of the vehicle system can be done optionally by one of the first vehicle or the second vehicle.

The status of all activity between positioning of the vehicle system prior to the unloading/loading and completion of the unloading/loading can be logged or otherwise recorded.

A primary controller or control unit (e.g., one or more processors) disposed onboard one vehicle (e.g., a propulsion-generating vehicle) of the vehicle consist can control braking of a plurality of other vehicles in a vehicle system by communicating with secondary controllers (e.g., brake controllers) onboard each of the other vehicles. A unique data address of each secondary controller can be stored in a memory associated with the primary controller. A first percentage of braking can be provided by the primary controller to each secondary controller of a first subset of the vehicles using the data addresses of the vehicles in the first subset. The primary controller can provide a second percentage of braking to each secondary controller of a second subset of the vehicles using the data addresses of the vehicles in the second subset. The subsets can include different groups of the vehicles, with no vehicle included in more than a single subset.

The data regarding the first percentage of braking includes data for the brakes of each vehicle in the first subset to be set to a first percentage of braking. The data regarding the second percentage of braking includes data for the brakes of each vehicle in the second subset to be set to a second percentage of braking that is different from the first percentage of braking. Implementation in time of the first percentage of braking of the first subset of the vehicles at least partially overlaps implementation in time of the second percentage of braking of the second subset of the vehicles. For example, the first percentage of braking of the first subset of vehicles and the second percentage of braking of the second subset of vehicles occurs at least partially at the same time.

The vehicles in each subset can be continuous (the vehicles are adjacent or neighbor each other without any vehicles not in the subset being located between vehicles in the subset) or can be discrete (the vehicles in a subset are separated from each other by one or more vehicles in another subset).

Following directing the vehicles in the first subset to the first braking percentage and the vehicles in the second subset to the second braking percentage, the primary controller can send a third percentage of braking to each secondary processor of the vehicles in the first subset using the data addresses of those vehicles. This third percentage can be different from both the first and second braking percentages.

At least one of the subsets of vehicles cars can be defined by a virtual zone. For example, the vehicles located within a defined area or volume (the virtual zone) may be included in a first subset while other vehicles may be in another subset (e.g., the second subset). In one embodiment, the virtual zone can be at a fixed location. As the vehicle system moves through the virtual zone, the vehicles included in the virtual zone changes due to the virtual zone remaining stationary while the vehicle system moves through the virtual zone.

In response to disruption of communication between a secondary controller and the primary controller, the secondary controller can maintain the percentage of braking of the brake system controlled by that secondary controller.

The vehicles and/or the braking profiles of the vehicles forming at least one of the first and second subsets can be dynamically altered (e.g., changed as the vehicle system moves).

Implementation of the first percentage of braking can be partially or fully concurrent with implementation of the second percentage of braking. For example, the first and second percentages of braking in the corresponding first and second subsets may be applied simultaneously (e.g., begin and end at the same time) or may be applied concurrently (e.g., application of one percentage begins before the other percentage, but both percentages are eventually applied at the same time).

One or more embodiments of the inventive subject matter described herein provide an ECP dumper braking mode, on top of (or as an alternative to) ECP modes, that is defined to only be used during slow speed rotary dumping operation.

Although ECP dumper braking may utilize an existing S-4200 compliant car and locomotive equipment, this braking operationally goes outside of the S-4200 performance requirements. The performance and fault responses of the ECP cars and ECP locomotives, when in ECP Dumper Braking mode, will not follow the S-4200 standard in several significant ways in order to provide significant new features that are not currently available:

a) The capability to have some of the car brakes applied and some released, at the same time, all under control of the lead ECP locomotive.

b) The capability of the car and locomotives to not enforce an ECP emergency when sensing a critical loss of HEU beacon fault condition.

c) The capability to quickly transition into ECP Dumper Braking mode and to resume ECP RUN operation when exiting ECP Dumper Braking mode, using the consist information that was in place when ECP Dumper Braking was first initiated. This will be accomplished without performing a lengthy ECP setup, and potentially using a different locomotive as the ECP lead.

ECP Dumper Braking can be tied into a railroad's automated dumping system in order to allow the speed characteristics of the Indexer to be increased or maximized, to optimize the braking for different track profiles leading up to the dumper, to minimize or reduce the total duration of the train dumping operation, and to communicate ECP Dumper Braking progress status and fault issues to the railroad's rotary dumper operating personnel.

In operation, the ECP dumper braking mode may involve:

1. A loaded ECP train in ECP dumper braking mode arrives at a rotary dumper, and the first car is positioned appropriately at the indexer.

2. The lead ECP locomotive may potentially be removed for servicing and a new ECP locomotive brought in to lead the train through the ECP dumper mode process. The new lead locomotive may be placed at the same end or may be placed at the opposite end of the train, depending on the railroad's track configuration at the dumper. If a lead locomotive is switched out, then the consist information (sequence of cars, locos, including unique ID's and other static Info parameters) can be electronically transferred to the new lead locomotive. The new lead will insert itself into the proper sequential spot in the train, remove the old lead locomotive from the roster, and reverse the consist order If necessary. The new lead locomotive will not need to restart ECP RUN mode and will not need to reacquire the train.

3. The desired braking profile for the specific rotary dumper that will be used will be downloaded to the lead locomotive via local radio or cell network.

4. ECP dumper braking mode may only be initiated by the lead ECP HEU, subject to confirmed authorization from any ATP system, when at zero speed, and when at a position within a designated geo-fence "dumper mode startup" area (this is an example of the type of criteria that may be used, but that may change based upon customer requirements and FMEA results). All cars of the train enter ECP Dumper Braking mode when commanded by the lead locomotive and begin to process non-S-4200 ECP Dumper Braking commands.

5. Individual cars in the train apply and/or release their brakes to varying application levels, under command from the lead ECP HEU, based upon the desired braking profile that was downloaded at startup in #3 above, and based upon the current progression of the train through the dumping process. This will require new proprietary messages on the ECP trainline to communicate between the rail car processors and the locomotive processor.

6. If the ECP trainline becomes snagged and happens to come apart during the rotary dumping process (this has been observed to happen occasionally), the cars and locomotives desirably do not apply their brakes in a penalty (100%) as would be the standard normal ECP response. When in ECP Dumper Braking mode, a car that loses communications from the ECP lead locomotive can continue to follow the current downloaded braking profile while operating on battery power.

7. The braking status of the train may be communicated to the railroad's automated dumping system to allow the speed of the rotary dumper and indexer system to be optimized.

8. Upon completion of the dumping operation, either under command from a remote railroad operator, or upon arrival at a position within a designated geo-fence "ECP Dumper Braking exit" area, the lead locomotive can exit ECP Dumper Braking mode and resume standard S-4200 ECP operation.

9. New log entries can be generated that detail when ECP Dumper Braking mode has been started, and when it has been exited, along with any irregularities that may have been encountered when running ECP Dumper Braking mode.

The ECP Dumper Braking mode enable use of the ECP trainline in a non-standard manner as described in items 5 & 6 above.

The steps of setting up and exiting ECP Dumper Braking Mode, as described in items 4, 7 & 8 can be important, but can be accomplished in other ways besides what is described in 4,7 & 8.

The ability to transfer a train configuration from one locomotive to another, as described in item 2, is optional to a railroad's operation, and is something that could be considered separately outside of an ECP Dumper Braking mode. In some instances this capability is required, but it is not essential that it be included in every instance of ECP Dumper Braking mode.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example (s) illustrated in the attached drawings, and described in the following specification, are simply exemplary examples or aspects of the invention. Hence, the specific examples or aspects disclosed herein are not to be construed as limiting.

FIG. 1 illustrates a vehicle system 14 having one embodiment of a brake control system 100. The vehicle system 14 includes a propulsion-generating vehicle 16 and a number of non-propulsion-generating vehicles 18-1-18-X, where "X" can be any whole number ≥2. In an example to be discussed hereinafter, the vehicle system will be described as including ten vehicles 18-1-18-10. However, the vehicle system may have more propulsion-generating vehicles and/or a different number of non-propulsion-generating vehicles.

The vehicle 16 includes a compressor 20 which operates to supply pressurized air to a brake pipe 32 which in turn supplies pressurized air to an air tank 22 in the vehicle 16 and in each vehicle 18. The pressurized air stored in each air tank 22 is utilized to control the braking of the vehicle 16 and each vehicle 18 of the vehicle system 14. Vehicle 16 includes an electronically controlled pneumatic (ECP) control unit 26. In one embodiment, this control unit can be a head-end-unit (HEU) 26. The control unit 26 is coupled via a communication pathway 28 to a brake controller 30 in each vehicle 18. This communication pathway 28 can be one or more conductive pathways, such as cables, buses, wires, trainlines, or the like. The brake controller can be a brake controller in one embodiment.

In an example, the communication pathway 28 acts in the nature of a communication network, such as, for example, without limitation, a local area network (LAN), between at least each controller 30 and control unit 26. More specifically, in response to brake command signals provided by the control unit 26 to each controller 30 via the communication pathway 28, each brake controller 30 controls the pressure of pressurized air supplied from the air tank 22 to the pneumatic brakes of the vehicle in accordance with the brake command signals, thereby controlling the percent braking of the vehicle 18.

In an ECP braking mode of operation, the brakes of a train can be controlled in accordance with the Association of American Railroads (AAR)S-4200 standard braking profile.

In accordance with the S-4200 standard, in response to the control unit 26 outputting a train brake command of, for example, 20% braking on ECP trainline 28, each brake controller 30 causes the brakes of its corresponding vehicle 18 to be set to 20% of full braking. In another example, in response to control unit 26 outputting a 50% train brake command (50% braking), each brake controller 30 causes the brakes of its corresponding vehicle 18 to be set to 50% of full braking. In yet another example, in response to control unit 26 outputting a 100% train brake command (100% braking), each brake controller 30 causes the brakes of its corresponding vehicle 18 to be set to 100% braking, or full braking. For emergency braking, control unit 26 outputs a 120% train brake command.

As can be seen, each brake controller 30 acts on brake commands output by the control unit 26 in the same manner, namely, the brakes of each vehicle 18 are set to the same percentage of full braking. Hence, in accordance with the S-4200 standard, and except for minor pneumatic and mechanical variations between the pneumatic brakes of each vehicle 18, in response to a vehicle system brake command, the brakes of each vehicle 18 respond in the same manner, i.e., the brakes of each vehicle 18 are set to the same percentage of braking as the brakes of each other vehicle 18.

Also, the brakes of vehicle 16 can be controlled in a similar manner by the control unit 26. Namely, in response to outputting a 20%, 50%, or 100% brake command to the communication pathway 28, the control unit 26 also causes the brakes of vehicle 16 to assume the same percentage of braking as the vehicles 18 of vehicle system 14. Hence, by way of the S-4200 standard, the brakes of vehicle 16 and each vehicle 18 of vehicle system 14 can be set to the same percentage of braking, thereby minimizing, reducing, or avoiding undue stress on the mechanical couplers 60 that couple each pair of vehicles 18 and couple vehicle 16 and vehicle 18-1.

Figure 2:
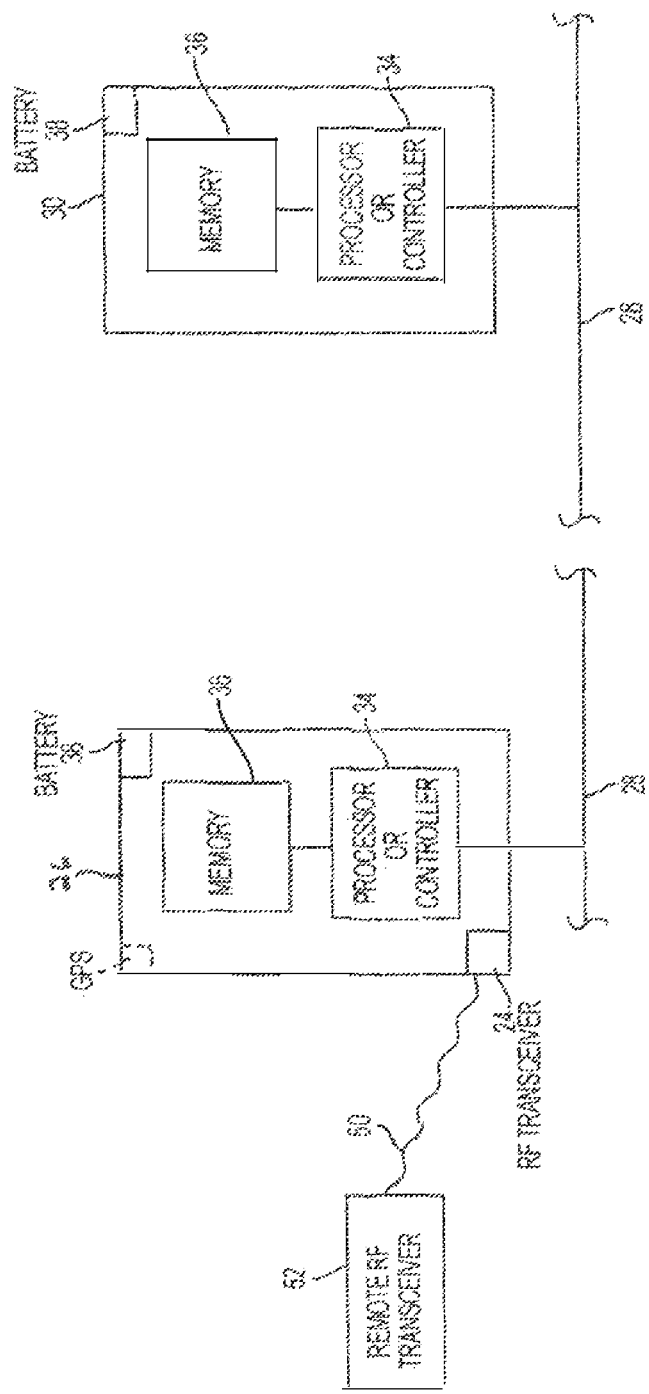
FIG. 2 is a schematic illustration of a brake control system.

With reference to FIG. 2, in an example, the control unit 26 and each brake controller 30 includes one or more processors 34 communicatively coupled to the communication pathway 28 and a memory 36 coupled to the processors 34 and operative for storing software control program(s). For example, the memory 36 of the control unit 26 stores a first software control program that, when executed by the processor(s) 34 of the control unit 26, implements the control unit 26 as part of the S-4200 standard braking profile while the memory 36 of each braking controller 30 stores a first ECP software control program that, when executed by the processor(s) 34 of the brake controller 30, implements the brake controller 30 part of the S-4200 braking profile for controlling the braking of the corresponding vehicle 18 in response to command signals received by the brake controller 30 from the control unit 26 operating under the control of the first software control program. The first software control program stored in the memory 36 of the control unit 26 is configured to control the operation of the pneumatic brakes of each vehicle 18 via the corresponding brake controller 30 and to control the brakes of vehicle 16.

Each memory 36 can include dynamic, volatile memory, e.g., RAM, that loses program code and data stored therein when power to the memory 36 is lost or when overwritten by the corresponding processor(s) 34, and a non-volatile memory, e.g., ROM, flash memory, and the like, the latter of which (non-volatile memory) can store, at least, an embedded operating system for use by the corresponding control unit 26 or brake controller 30 in the presence or absence of power applied to the non-volatile memory of the corresponding processor(s) 34.

In normal operation, each brake controller 30 receives electrical power for operation via the communication pathway 28. Each brake controller 30 can also include a battery 38 that provides electrical power to the corresponding processor(s) 34 and memory 36 in the event power on the communication pathway 28 is lost, e.g., due to a separation of the part of the communication pathway 28 joining the brake controller 30 to the control unit 26.

The control unit 26 receives electrical power for operation from a battery or generator of vehicle 16. The control unit 26 can also include a battery 38 that provides electrical power to processor(s) 34 and memory 36 of the control unit 26 in the event no electrical power is being provided by the battery or generator of vehicle 16

During the formation of the vehicle system 14, consist information, including the sequence of vehicles, propulsion-generating vehicles, unique vehicle IDs, and other static information parameters regarding vehicle system 14 is acquired by the control unit 26 and stored in memory 36 thereof. This consist information includes the identification of vehicle 16 and each vehicle 18 of vehicle system 14 as well as their positions within vehicle system 14. For example, where vehicle system 14 includes a lead vehicle 16 and vehicles 18-1-18-X as shown in FIG. 1, the consist information will include data identifying vehicle 16 as the first vehicle of the consist; vehicle 18-1 as the second car of the consist that is positioned between vehicle 16 and vehicle 18-2; that vehicle 18-2 as the third car of the consist that is positioned between vehicles 18-1 and 18-3; and so forth including that vehicle 18-X is the final car of the consist.

The normal ECP mode of braking provided by the S-4200 standard braking profile is satisfactory for modes of operation where movement of the consist is controlled by one or more vehicles 16 in the manner discussed above. However, where the consist is, for example, an ore train or a coal train, and the ECP braking mode has been disabled for a unloading/loading operation, e.g., a dumping operation, (whereupon the brakes of the rail cars are completely released, and all movement and stops of the rail cars are controlled by, for example, an indexer) it has been found that undesirably high coupler 60 forces can be produced throughout the vehicle system during stepped or indexed movement associated with the unloading/loading operations, e.g., rotary dumping, of the vehicles 18 of vehicle system 14 when the vehicle system is brought into a yard, i.e., off the mainline, for transfer of its cargo from the vehicle system to outside the vehicle system.

Accordingly, disclosed herein is an ECP dumper mode braking profile that can be used in lieu of the S-4200 standard braking profile during slow speed stepped or indexed rotary dumping operation within a secure and/or off-the-mainline location, such as a storage yard or processing yard. As will be described hereinafter, the ECP dumper mode braking profile goes outside of the S-4200 standard braking profile requirements and changes the performance and fault responses of the brake controller 30 of each vehicle 18 and the control unit 26 when operating in the ECP dumper mode braking profile. More specifically, when the control unit 26 and each brake controller 30 is operated in the ECP dumper mode braking profile, the control unit 26 and each brake controller 30 will not follow the S-4200 standard braking profile in several ways in order to provide one or more new features that are currently not available. These features can include, for example: the capability to have the brakes of each vehicle 18 applied the same or differently, independently or in groups (continuous or discrete), fully or partially, with some brakes released, at the same time, all under the control of the control unit 26; the capability of each vehicle 18 and the control unit 26 to not enforce an emergency braking condition, for example, 120% braking upon a separation of the communication pathway 28 between said vehicle 18 and vehicle 16; and the capability to quickly transition into ECP dumper mode braking profile and to resume ECP braking mode (in compliance with the AAR S-4200 standard) when exiting the ECP dumper mode braking profile using the consist information that was in place when the ECP dumper mode braking profile was first initiated or a revised consist information. In an example, this can be accomplished without having to perform a lengthy ECP setup or initialization where the consist information is generated and stored in memory 36 of the control unit 26.

Moreover, in an example, the ECP dumper mode braking profile of vehicle system 14 can be tied to a railroad's automated dumping system, involving an indexer, in order to allow the speed characteristics of the indexer to be maximized; to optimize braking for different track profiles leading up to or away from the dumper station, to minimize the total duration of vehicle system 14 in the dumping operation; and to communicate ECP dumper mode braking profile progress, status, and fault issues to operating personnel. In an example, a communication of ECP dumper mode braking profile progress status and fault issues can occur wirelessly between the control unit 26 and one or more portable devices available to operating personnel of a dumping system, e.g., a rotary dumper. An example of the ECP dumper mode braking profile will now be described with reference to a rotary dumper and an indexer.

The example ECP dumper mode braking profile shown in FIGS. 3-7 illustrate the sequential stepping or indexing of the vehicles 18 of an example vehicle system 14 through a stationary rotary dumper 40, wherein the vehicles 18 are stepped through the rotary dumper via an automated movement system, hereinafter, indexer 42. In FIGS. 3-7, it is to be appreciated that rotary dumper 40 and indexer 42 are stationary and that the vehicles 18 of vehicle system 14 are stepped or indexed (to the left in FIGS. 3-7) through stationary rotary dumper 40 via indexer 42 which is positioned proximate rotary dumper 40.

In this example, the vehicle system includes vehicle 16 and a set of vehicles 18-1-18-10. Rotary dumper 40 is configured to perform a rotary dumping operation on subsets or groups of vehicles 18—one subset or group of vehicles 18 at a time. Herein "subset" or "group" means "a set consisting of elements of a given set that can be the same as the given set or smaller".

In an example, rotary dumper 40 can be configured to perform a rotary dumping operation on any number of cars, such as, without limitation, one vehicle 18, two vehicles 18, three vehicles 18, or more. For the purpose of describing the examples herein, rotary dumper 40 will be described as performing a sequential rotary dumping operation on a first subset or group of vehicles 44-1 (18-1, 18-2), then a second subset or group of vehicles 44-2 (18-3, 18-4), then a third subset or group of vehicles 44-3 (18-5, 18-6), then a fourth subset or group of vehicles 44-4 (18-7, 18-8), and finally on a fifth subset or group of vehicles 44-5 (18-9, 18-10). Moreover, for the purpose of description, the brakes of each vehicle 18 will be described as being operated under the control of the control unit 26, which operates as a central control of a locomotive. However, this is not to be construed in a limiting sense since it is envisioned that the brakes of each car can be operative in any suitable and/or desirable manner, including, without limitation, via a wireless communication link 50 (FIG. 2) between a remote RF transceiver 52 and an RF transceiver 24 (FIG. 2) of the control unit 26. In this example, RF transceiver 24 and the control unit 26 operate in the nature of a RF repeater between remote RF transceiver 52 and each brake controller 30. In an example, remote RF transceiver 52 can be operated in coordination with the operation of indexer 42 to step or index vehicle system 14 in concert with the setting of brake values on one or more cars (via one or more brake controllers 30).

ECP dumper mode braking profile will now be described.

Figure 3:
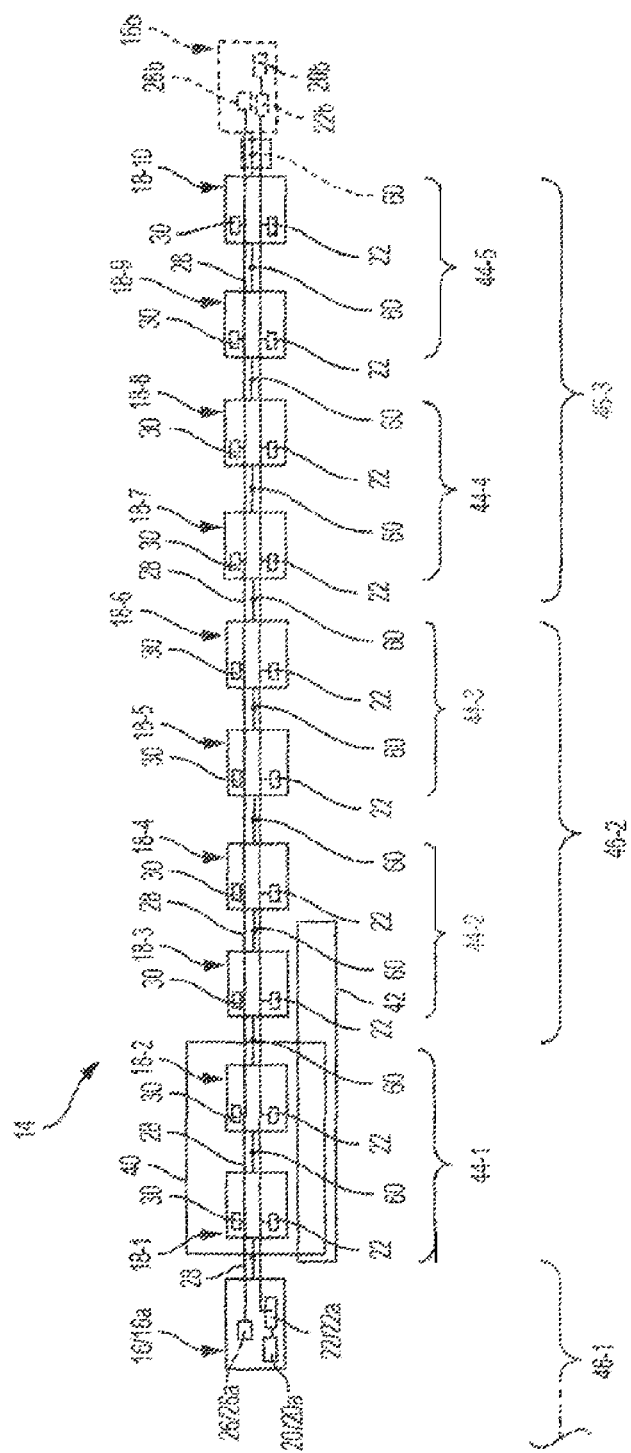

In an example, under the control of vehicle 16, vehicle system 14 moves from a position to the right of rotary dumper 40 to the position shown in FIG. 3 with the first subset of vehicles 44-1 in rotary dumper 40. In this position, the brakes of the second through fifth subset of vehicles 44-2-44-5 can all be set to a single value, e.g., 10% braking. In another example, the second and third subset of vehicles 44-2 and 44-3 can be set to a first braking value, e.g., 10% braking, while the fourth and fifth subset of vehicles 44-4 and 44-5 can be set to a second, different braking value, e.g., 20% or 30% braking. In another example, the first subset of vehicles 44-1 can be set at the same braking value as a second subset of vehicles or can be set to a different braking value, e.g., 0% braking.

Figure 4:
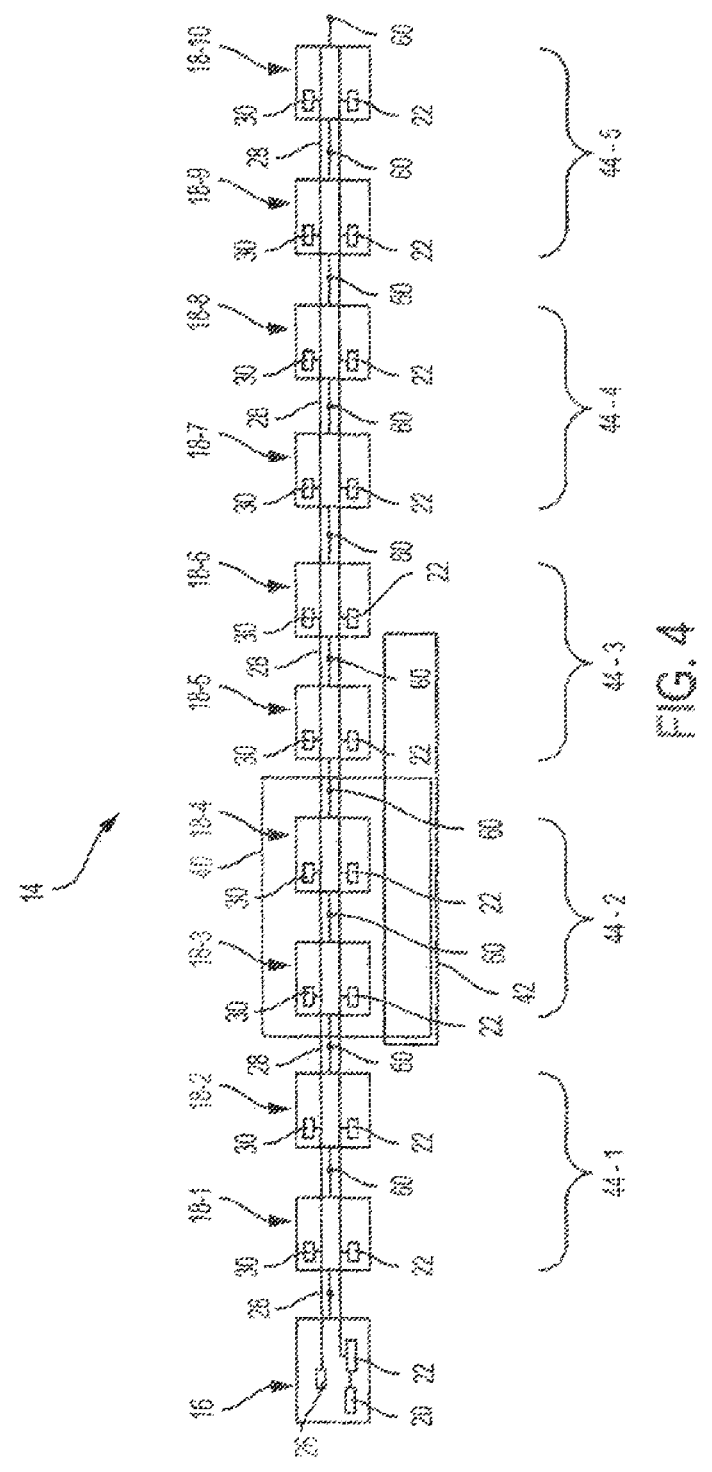

After the rotary dumping operation has been performed on the first subset of vehicles 44-1, indexer 42 steps or indexes vehicle system 14 to the left until the second subset of cars 44-2 are positioned at rotary dumper 40 as shown in FIG. 4. In preparation for this movement, the brakes of the first subset of vehicles 44-1 can be set to 0% braking value (if not already set to this value) and can remain at 0% braking for the remainder of this example.

When vehicle system 14 is in a position shown in FIG. 4 with the second subset of vehicles 44-2 positioned at rotary dumper 40, the brakes of the third through fifth subset of vehicles 44-3-44-5 can be set to the same braking value, e.g., 10% braking, or multiple values, e.g., the third subset of vehicles 44-3 can be set at 10% braking and the fourth and fifth subset of vehicles 44-4 and 44-5 can be set at 20% or 30% braking. In another example, the third and fourth subset of vehicles 44-3-44-4 and can be set to 10% braking and the fifth subset of cars can be set to 20% or 30% braking. In this manner, as vehicles 18 approach and enter rotary dumper 40, the percent braking on said vehicles 18 can be changed, e.g., reduced or increased, as desired. Once inside rotary dumper 40, the braking level can remain at the same braking setting value before the cars are moved into the rotary dumper 40 or can be set or changed to a different braking value, e.g., 0% braking.

Figure 5:
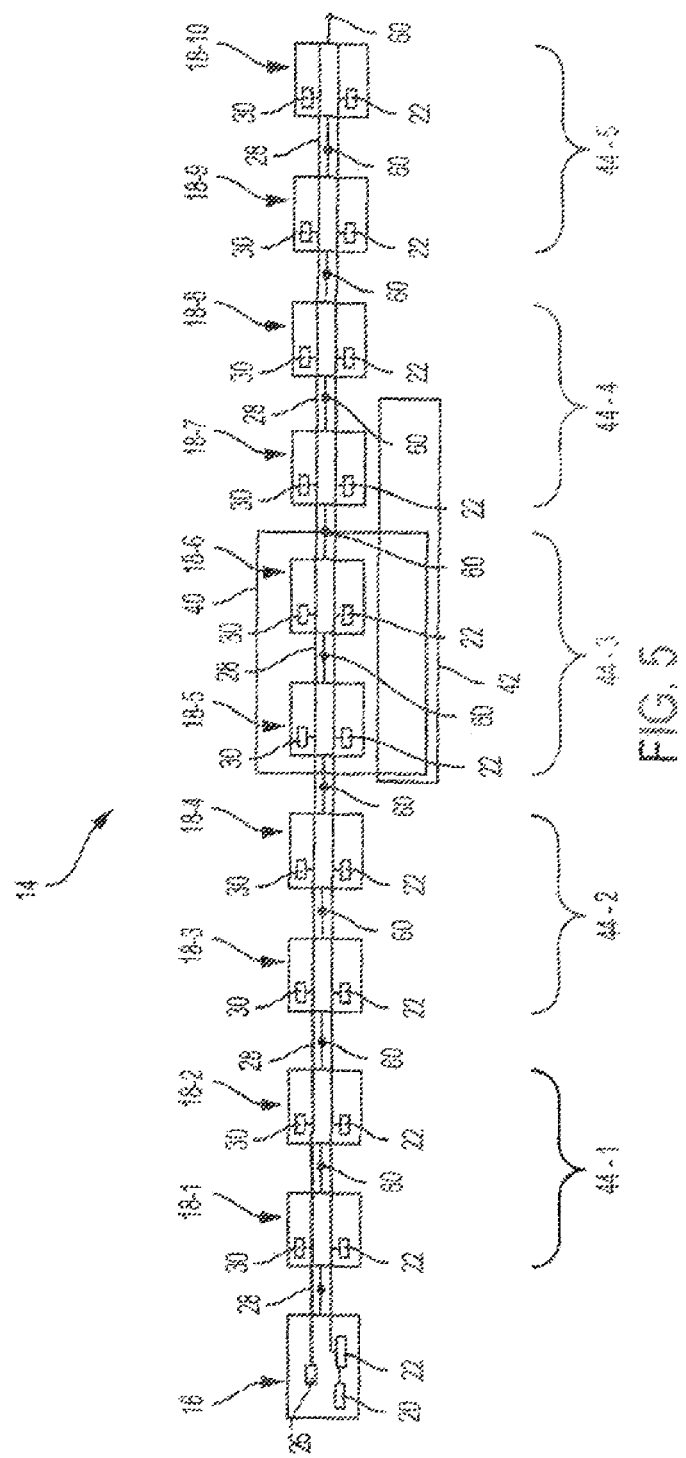

Once the rotary dumping operation has been completed for the second subset of vehicles 44-2, indexer 42 steps or indexes vehicle system 14 to the left until the third subset of vehicles 44-3 are positioned at rotary dumper 40 as shown in FIG. 5. Prior to this movement, the brakes on the first and second subsets of vehicles 44-1 and 44-2 can be set to 0% braking.

Once the third subset of vehicles 44-3 are positioned in rotary dumper 40, the brakes of the fourth and fifth subset of vehicles 44-4 and 44-5 can be set to the same braking value, e.g., 10% braking, or to different braking values, e.g., the fourth subset of vehicles 44-4 can be set to 10% braking and the fifth subset of vehicles 44-5 can be set to 20% or 30% braking. Hence, as can be seen, the brakes of cars exiting rotary dumper 40 can have their brakes set to 0% braking since these cars are now empty and the forces produced by indexer 42 on the couplers 60 at the vehicle 16 end of vehicle system 14 are less compared to the forces produced on the couplers 60 connecting one or more vehicles 18 containing material to be unloaded or dumped by rotary dumper, e.g., ore or coal.

In this example, the brakes of the third subset of vehicles 44-3 in rotary dumper 40 can be set at the same brake level that said brakes were set prior to entering rotary dumper 40 or can be set to 0% braking.

Figure 6:
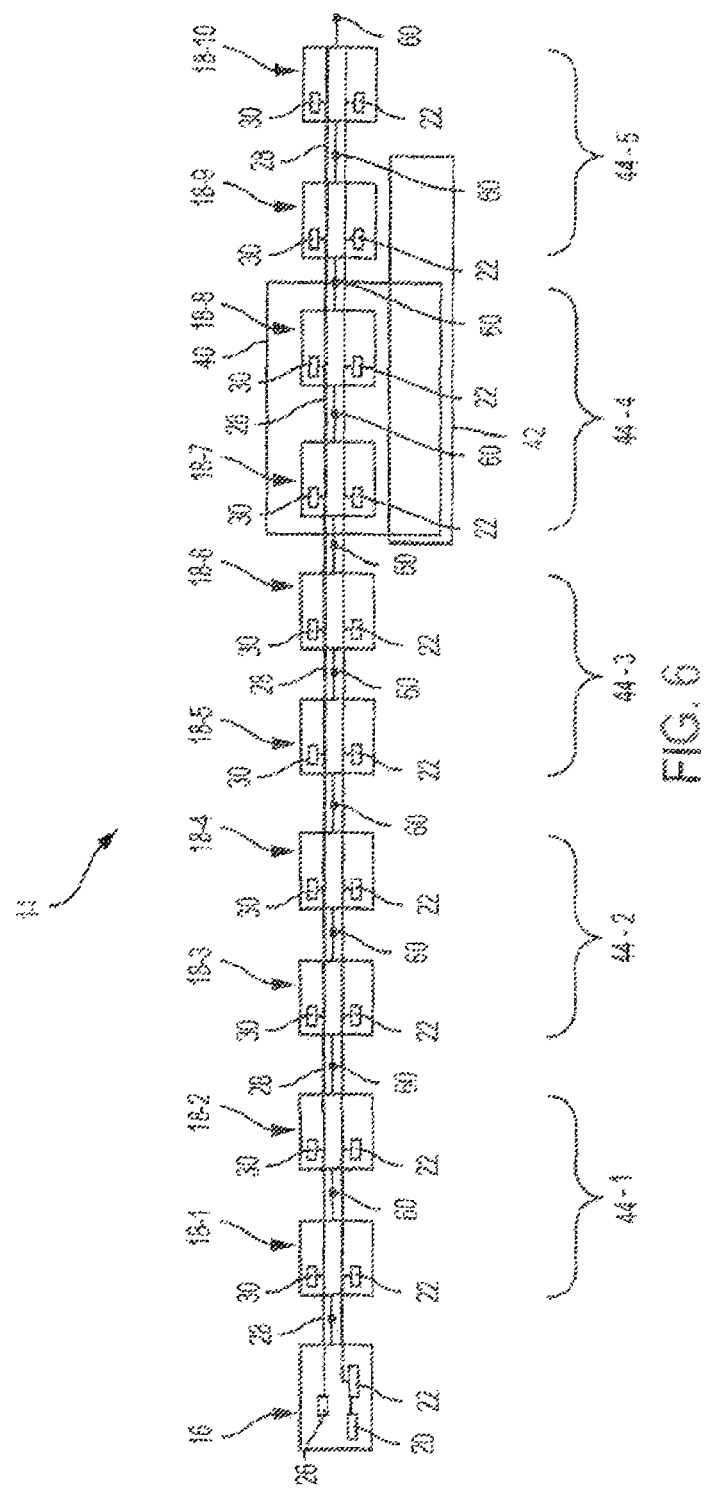

Once the rotary dumping operation of the third subset of vehicles 44-3 is complete, vehicle system 14 is stepped or indexed to the left via indexer 42 until the fourth subset of vehicles 44-4 are positioned in rotary dumper 40 as shown in FIG. 6. Prior to this movement, the brakes on the third subset of vehicles 44-3 can be set to 0% braking.

In this position, the first through third subset of vehicles 44-1-44-3 can have their brakes set at 0% braking, the fifth subset of vehicles 44-5 can have their brakes set at 10% braking, and the fourth subset of vehicles 44-4 can have their brakes set at either the same brake level that said brakes were set prior to entering rotary dumper 40 or at 0% braking.

Figure 7:
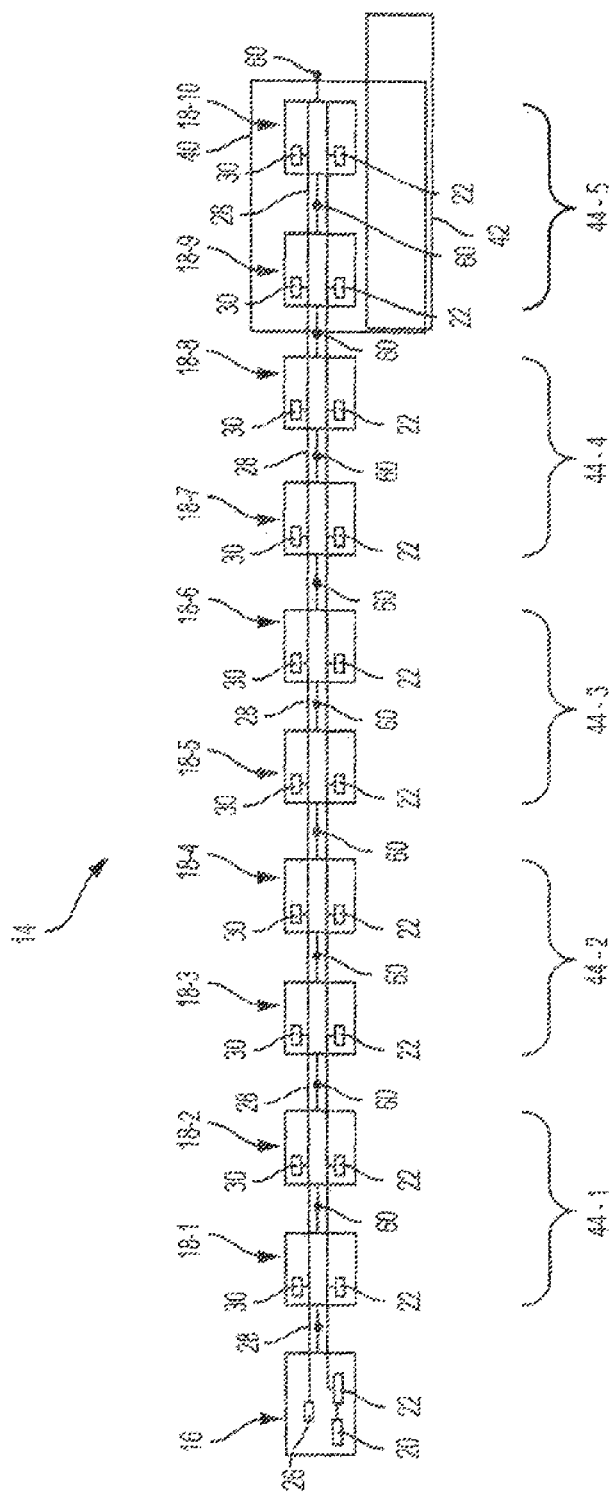

Upon completion of the rotary dumping operation of the fourth subset of vehicles 44-4, vehicle system 14 is stepped or indexed to the left by indexer 42 until the fifth subset of vehicles 44-5 are positioned at rotary dumper 40 as shown in FIG. 7. During this movement, the vehicles positioned between rotary dumper 40 and vehicle 16 can have their brakes set to 0% braking while the fifth subset of vehicles 44-5 either have their brakes set to 0% braking or to the level of braking prior to movement into rotary dumper 40.

Upon completion of the rotary dumping operation on the fifth subset of vehicles 44-5, vehicle system 14 is moved to the left away from the rotary dumper 40, e.g., via vehicle 16.

By changing the braking profiles (percent braking) of one or more of the vehicles 18 prior to entering rotary dumper 40, the in-train forces on the couplers 60 of said cars can be reduced over operating said brakes in full release mode (0% braking).

In the foregoing example, the cars exiting the rotary dumper 40 were described as having their brakes set at 0% braking. However, this is not to be construed in a limiting sense since it is envisioned that the vehicles 18 exiting rotary dumper 40 can have their brakes set at one or more levels that help avoid undesirable in-train forces on the couplers 60 joining said vehicles 18. Moreover, the different percentages of braking of each vehicle or each subset of vehicles described above (before entering or after exiting rotary dumper 40) is not to be construed in a limiting sense since it is envisioned that any combination of percent braking that permits movement of the cars in a manner described above while minimizing or avoiding undesirable in-train forces on the couplers 60 can be used. In an example, with reference to FIG. 3, prior to entering rotary dumper 40, each vehicle 18-3-18-10 can have a different brake setting as deemed suitable or desirable. For example, vehicle 18-3 can have a 5% brake setting, vehicle 18-4 can have a 10% brake setting, vehicle 18-5 can have a 15% brake setting, and so forth, with vehicle 18-10 having a 40% brake setting.

Figure 8:
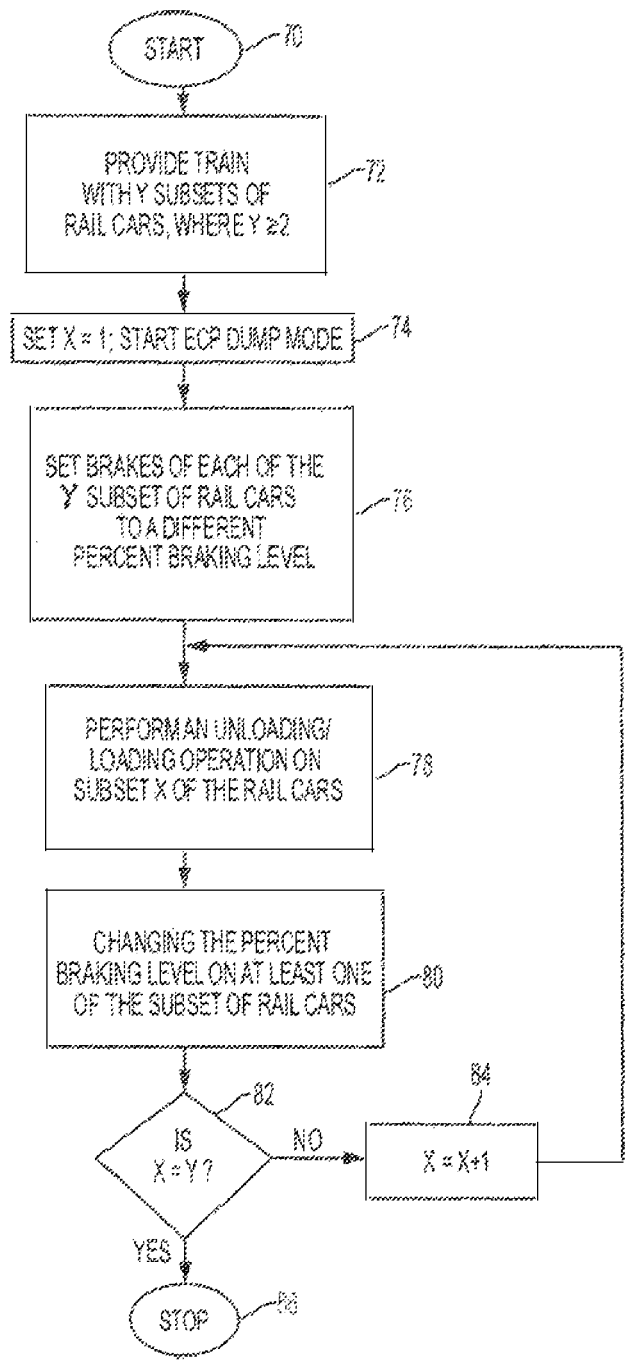
FIG. 8 is a flow diagram of an example method of controlling the brakes of multiple subsets of vehicles of an example vehicle system during a stepped or indexed unloading/loading operation.

With reference to FIG. 8, an example method of ECP dumper mode operation begins at Start step 70 and advances to step 72 wherein vehicle system 14 with Y subset of rail vehicles 18 is provided, and Y ≥2. The method then advances to step 74 where the value of a variable X is set equal to 1 and the ECP dumper mode braking profile is started (and operation in accordance with the S-4200 standard braking profile is suspended).

The method then advances to step 76 where the brakes of each of the Y subsets of vehicles are set to a different percent braking value, e.g., a first subset of vehicles (e.g., 44-2) is set to first percentage braking and a second subset of vehicles (e.g., 44-3 or 44-4) is set to a second percentage braking. The method then advances to step 78 where a loading or unloading operation is performed on subset X of the vehicles.

The method then advances to step 80 where the percent braking on at least one of the subset of vehicles is changed. If, in decision step 82, it is determined X Y, the method advances to step 84 where the value of X is increased by one (X=X+1). Thereafter, steps 78, 80, 82, and 84 are repeated until, in an instance of step 82, it is determined that X=Y whereupon the method advances to Stop step 86 and terminates, whereupon vehicle system 14 reverts to operating in accordance with the S-4200 standard braking profile.

In the various example ECP dumper mode braking profiles described herein, the memory 36 of the control unit 26 can also store a second the control unit software control program that implements the control unit 26 part of the ECP dumper mode braking profile and the memory 36 of each brake controller 30 can also store a second ECP software control program that implements the brake controller 30 part of the ECP dumper mode braking profile for controlling the braking of the corresponding vehicle 18 in response to command and control signals received by the brake controller 30 from the control unit 26 operating under the control of the second the control unit software control program.

In an example, the second the control unit software control program and the second ECP software control program can permanently reside in non-volatile parts of memory 36 of the control unit 26 and each brake controller 30, respectively. In another, more desirable, example, the second the control unit software control program and the second ECP software control program can be download into dynamic parts of memory 36 of the control unit 26 and each brake controller 30, respectively, when it is desired to implement the ECP dumper mode braking profile. In a non-limiting example, the second the control unit software control program and the second ECP software control program can be downloaded into the memories 36 of the control unit 26 and each brake controller 30 via the wireless communication link 50 (FIG. 2) with RF transceiver 24 of the control unit 26.

In an example, memory 36 of the control unit 26 can include an embedded the control unit operating system program, e.g., stored in the non-volatile part of memory 36 of the control unit 26, that can cause the second the control unit software control program downloaded via wireless communication link 50 to be stored in dynamic part of memory 36 of the control unit 26. In another example, the embedded the control unit operating system program of the control unit 26 can also cause the second ECP software control program downloaded via wireless communication link 50 to be stored in the dynamic part of memory 36 of each brake controller 30 via the communication pathway 28. In this latter example, non-volatile part of memory 36 of each brake controller 30 can include an embedded ECP operating system program that cooperates with the embedded the control unit operating system program to store the second ECP software control program in the dynamic part of the memory 36 of the brake controller 30.

An advantage of storing the second the control unit software control program and each instance of the second ECP software control program in a dynamic part of memory is that these programs can be readily erased from dynamic memory by cycling power to the control unit 26 and the brake controllers 30, and/or by causing the controllers 34 of the control unit 26 and the brake controllers 30 to overwrite the dynamic memories of the memories 36 thereof, thereby avoiding inadvertent execution of one or both of these second programs when vehicle system 14 is being operated in the S-4200 standard braking profile.

In an example, prior to the rotary dumping operation described above, an original vehicle 16 used to initially position vehicles 18 for the rotary dumping operation can be removed for servicing and replaced with a new vehicle 16a or 16b brought in for the stepping (or indexing) of vehicles 18 through the rotary dumper 40. As shown in FIG. 3, in an example, new vehicle 16a can be placed at the same end of vehicle system 14 as the original vehicle 16 removed for servicing. In FIG. 3, the control unit 26a, compressor 20a, and air tank 22a of new vehicle 16a are used in replacement of the control unit 26, compressor 20, and air tank 22 of the original vehicle 16 removed for servicing. In another example, the new vehicle 16b can be placed at the opposite end of the vehicle system 14, as shown in phantom in FIG. 3. New vehicle 16b can include the control unit 26b, compressor 20b, and air tank 22b in replacement of the control unit 26, compressor 20, and air tank 22 of the original vehicle 16 removed for servicing.

If the original vehicle 16 is switched for a new vehicle 16a or 16b (at the same end or the opposite end of vehicle system 14), the consist information (sequence of cars, locomotives, including unique IDs and other static information parameters) can be electronically transferred to the new vehicle 16a or 16b in any suitable and/or desirable manner. In an example, the consist information can be downloaded to the control unit 26a or 26b of new vehicle 16a or 16b from the control unit 26 of the original vehicle 16 via wireless communication link 50, e.g., a local radio or cell network. In another example, the new vehicle 16a or 16b can be coupled to the ECP trainline 28 before the original vehicle 16 is removed from the train and the consist information can be downloaded from the control unit 26 of the original vehicle 16 to be removed from the consist to the control unit 26a or 26b of the new locomotive via the communication pathway 28. Thereafter, the original vehicle 16 can be removed from the consist.

One advantage of the consist including a locomotive, e.g., vehicle 16, is that the control unit 26 of said locomotive can enable the ECP dumper mode braking profile in each vehicle 18, e.g., in the manner described in the above examples, and can aid in maintaining the ECP dumper mode braking profile in each vehicle 18 during the rotary dumping operation. For example, control unit 26 and each brake controller 30 can be configured such that control unit 26 occasionally or periodically outputs to each brake controller 30 via ECP trainline 28 a signal that causes the brake controller 30 to remain in the ECP dumper mode braking profile. In an example, if an brake controller 30 of a vehicle 18 does not receive this signal a predetermined time after entering the ECP dumper mode braking profile or a predetermined time after receiving a prior signal, the brake controller 30 can execute a suitable fault or emergency condition, e.g., cause the brakes of the vehicle 18 to be set to 100% braking.

Once the consist information has been downloaded into the control unit 26a or 26b of the new vehicle 16a or 16b, the control unit can amend the consist information by inserting itself in the proper sequential location in the vehicle system, removing the original vehicle 16 from the consist information, and reverse the consist order if necessary, e.g., when the new vehicle 16b is placed at the other end of the train than the original vehicle 16. It is envisioned that the control unit 26a or 26b of the new vehicle 16a or 16b may not need to restart the ECP dumper mode braking profile already executing and/or may not need to reacquire the train consist information. However, this is not to be construed in a limiting sense.

As mentioned above, the ECP dumper mode braking profile can be downloaded to any locomotive coupled to vehicle system 14 via wireless communication link 50, e.g., a local radio or cell network. The desired braking profile utilized in the ECP dumper mode braking profile can be generic or can be unique to a specific rotary dumper 40. In an example, the ECP dumper mode braking profile described above in connection with FIGS. 3-7 can be a generic braking profile used when the terrain that vehicle system 14 travels on to and from the rotary dumper is flat or essentially flat. In another example, where the path of vehicle system 14 leading to the rotary dumper slopes downward toward rotary dumper 40, the percentage of braking on one or more of the cars prior to entering the rotary dumper 40 can be increased to account for the slope.

For example, with reference to FIG. 3, for flat terrain leading to rotary dumper 40, the braking of vehicles 18-3-18-6 can, in an example, be set at 10% braking while the braking of vehicles 18-7-18-10 can be set at 20% braking. In another example, where the path that vehicle system 14 traverses leading to rotary dumper 40 slopes downward toward rotary dumper 40, the brakes of vehicles 18-3-18-6 can be set at 10% braking while the brakes of vehicles 18-7-18-10 can be set at 30% or 40% braking. In another example, where the path of vehicle system 14 leading to rotary dumper 40 slopes upward toward rotary dumper 40, the brakes of vehicles 18-3-18-10 can be set to a single braking value, such as 10% braking, or multiple braking values, e.g., vehicles 18-3-18-6 can be set at 30% or 40% braking while the brakes of vehicles 18-7-18-10 can be set at 10% braking. In the foregoing examples, it is envisioned that the vehicles 18 exiting rotary dumper 40 can have their brakes set at 0% braking. However, this is not to be construed in a limiting sense since it is envisioned that the vehicles 18 exiting rotary dumper 40 have their brakes set at any suitable and/or desirable percent braking as determined by the application to avoid or minimize undue forces on the couplers 60.

The foregoing examples, however, are not to be construed in a limiting sense since it is envisioned that the percent braking of each vehicle 18 of vehicle system 14 can be set individually to any suitable and/or desirable percent braking value as deemed suitable and/or desirable for a specific rotary dumper 40 and/or the path of the terrain leading to and/or from said rotary dumper 40.

In another example, virtual zones 46 can be established along the path of vehicle system 14 on one or both ends of rotary dumper 40, e.g., virtual zones 46 can be established via GPS coordinates or via communication via wireless communication link 50. As vehicles 18 enter and exit each virtual zone 46, the braking value of each vehicle 18 can be adjusted to a % braking level established for said virtual zone 46. For example, a first virtual zone 46-1 can be established in the path of vehicles 18 exiting rotary dumper 40. This first virtual zone 46-1 can have associated with it a first percentage braking desired for each vehicle 18 in the first virtual zone 46. This first percentage braking can, in an example, be 0% or 5% braking. A second virtual zone 46-2 can be established for a predetermined number of vehicles 18 proximate to and about to enter rotary dumper 40. Second virtual zone 46-2 can have associated therewith a second percentage braking, e.g., 10% braking, for vehicles 18 in said second virtual zone 46-2. Further, a third virtual zone 46-3 can be established for vehicles 18 on the side of the second virtual zone 46-2 opposite rotary dumper 40. This third virtual safety zone can have associated therewith a third braking percentage, e.g., 20% braking, for vehicles 18 in the third virtual zone 46-3.

As vehicles 18 enter each virtual zone 46, the percent braking for the car can be adjusted dynamically based upon the percent braking established for said virtual zone. In an example, as vehicle 18-6 moves from the third virtual zone 46-3 into the second virtual zone 46-2, the percent braking of vehicle 18-6 can be changed from 20% braking (established for the third virtual zone 46-3) to 10% braking (established for the second virtual zone 46-2).

The foregoing example of three virtual zones is not to be construed in a limiting sense since it is envisioned that any number of virtual zones can be established in the path of the vehicle system 14 entering rotary dumper 40 or exiting rotary dumper 40 as deemed and/or desirable for the application. For example, a single virtual zone 46 on either side of rotary dumper 40 may be sufficient. In another example, three or more virtual zones 46 can be established in the path of the train entering rotary dumper 40.

In the foregoing examples, each subset 44 of rail vehicles 18 was described as being a continuous group of rail vehicles 18. However, this is not to be construed in a limiting sense it is also or alternatively envisioned that each subset or group 44 of vehicles 18 can be continuous and/or discrete. For example, vehicles 18-3 and 18-5 can comprise a first subset of cars operating in accordance with a first brake setting while vehicles 18-4 and 18-6 can comprise a second subset of cars operating under a second, different braking setting. Accordingly, each subset of cars can be constituted in any suitable and/or desirable manner that facilitates the rotary dumping operation performed by rotary dumper 40 while minimizing or avoiding undesirable in-train forces on the couplers.

In another example, one or more subset of vehicles 18 set at the same percent braking can be continuous and/or discrete. In an example, in the position of vehicle system 14 shown in FIG. 3, for example, a first subset or group of cars can include vehicles 18-3, 18-5, 18-7, and 18-9 set at, for example, 20% braking, and a second subset or group of cars that can include vehicles 18-4, 18-6, 18-8, and 18-10 set at, for example, 0% or 10% braking. The first and second groups of cars in this example can be dynamically altered as the vehicle system 14 is stepped or indexed through the rotary dumper 40. For example, with vehicle system 14 in the position shown in FIG. 4, the first subset or group of cars can be dynamically altered to include vehicles 18-5, 18-7, and 18-9 set at, for example, 20% braking, and the second subset or group of vehicles can be dynamically altered to include vehicles 18-6, 18-8, and 18-10 set at, for example, 0% or 10% braking. A third subset of vehicles 18-1 and 18-2 in FIG. 2 can be dynamically altered to include vehicles 18-1, 18-2, 18-3, and 18-4 in FIG. 4.

In another example with reference to the position of vehicle system 14 shown in FIG. 3, for example, a first subset or group of vehicles can include vehicles 18-3 and 18-8 set at, for example, 20% braking; a second subset or group of vehicles can include vehicles 18-4 and 18-7 set at, for example, 10% braking; and a third subset or group of vehicles can include vehicles 18-5 and 18-6 set at, for example, 0% or 5% braking. These examples of continuous and/or discrete subsets or groups of vehicles 18 set at the same percent braking, however, are not to be construed in a limiting sense.

In an example, the composition of the vehicles and/or the unloading/loading braking profiles for one or more vehicles within each of the one or more groups of the vehicles can be the dynamically altered based on the progression of the vehicle system through a loading/unloading process, upon changes to the loading/unloading system capability (for example, an indexer or rotary dumper operating at less than optimum performance), upon changes to the environment (for example, weather conditions including moisture, temperature, wind, etc.), and/or upon any other external change that can impact the loading/unloading process.

In an example, ECP dumper mode braking profile is launched by the control unit 26 coupled to communication pathway 28 when vehicle system 14 is at zero speed. In another example, ECP dumper mode braking profile can also or alternatively be initiated only when vehicle system 14 is within a designated geographical area relative to rotary dumper 40, e.g., as determined by (1) GPS locations of control unit 26 and rotary dumper 40, or (2) the wireless communication link 50 established between RF transceiver 24 of control unit 26 and the remote RF transceiver 52, the latter of which can be located proximate rotary dumper 40.

In an example, and as discussed above, the software code for implementing the ECP dumper mode of operation can be downloaded to a control unit 26 via wireless communication link 50. The software code segments that control the operation of each brake controller 30 can be downloaded thereto from control unit 26 via ECP trainline 28. The ECP dumper mode braking profile code utilized by control unit 26 to communicate percent braking commands to each brake controller 30 is retained in the memory 36 of control unit 26 at least during the time the ECP dumper mode braking profile is in use. In an example, each brake controller 30 enters the ECP dumper mode braking profile when commanded by control unit 26 and begins to process ECP dumper mode braking profile commands in the manner discussed above.

In an example, individual vehicles 18 of vehicle system 14 can apply and/or release their brakes to varying application or percent of full braking levels, under command from control unit 26, based upon the ECP dumper mode braking profile that was downloaded into the brake controller 30, and based upon the current progression of the rail vehicles 18 of vehicle system 14 through rotary dumper 40. In an example, if ECP trainline 28 happens to separate when control unit 26 and the brake controller 30 of each vehicle 18 is in the ECP dumper mode braking profile, it can be desirable that the vehicles 18 and vehicle 16 not apply their brakes at, for example, 120% braking as would occur if the S-4200 standard were in use. The S-4200 standard is specific in that 120% (i.e. emergency) braking occurs in the vehicles 18 and vehicle 16 in the event of a break in the ECP trainline. Rather, in this example, the brake controller 30 of one or more vehicles 18 that lose communication from control unit 26 can continue to follow the current braking profile (or percent braking) or go to 0% braking (also referred to as a full release condition), while operating on battery power if necessary. Also or alternatively, is control unit 26 loses communication with one or more brake controller 30, control unit 26 can cause the brakes of vehicle 16 to continue to follow the current braking profile (or percent braking) or go to 0% braking (also referred to as a full release condition), while operating on battery power if necessary. In this manner, there is no disruption of the rotary dumping operation of the cars of vehicle system 14 in the event of the ECP trainline 28 coming apart. By not going to emergency braking, the operator is able to save time in re-initialization of the vehicle system, the communication pathway and the braking system, which would cause a delay in the loading/unloading time.

In another example, the time that each brake controller 30 (and optionally control unit 26) continues to follow the current braking profile for ECP dumper mode braking profile after a loss of communication from control unit 26, e.g., due to break in the ECP trainline 28 between said brake controller 30 and control unit 26, can be limited to a predetermined period of time, e.g., 15 seconds, 30 seconds, 1 minute, 2 minutes, 3 minutes, etc., where after the brake controller 30 sets the brakes of its car to, for example, 100% braking. This delay in setting the brakes to 100% braking after a break in the ECP trainline 28 provides time for the break to be repaired without disrupting the ECP dumper mode of operation. In an example, a separation of ECP trainline 28 can be sensed by control unit 26 when control unit 26 falls out of communication with an ECP end of train unit (not shown) coupled in communication with control unit 26 via ECP trainline 28. However, this is not to be construed in a limiting sense since it is envisioned that a separation of ECP trainline 28 can also or alternatively be sensed by ECP trainline 28 falling out of communication with one or more brake controllers 30.

In an example, the braking status of vehicle system 14, e.g., each vehicle 18 and/or vehicle 16 of vehicle system 14, can be communicated via the wireless communication link 50 from control unit 26 to the remote RF transceiver 52, e.g., positioned proximate rotary dumper 40. This information can be used manually or in an automated manner to allow the speed of the rotary dumper 40 and indexer 42 to optimize the throughput of vehicle system 14 through rotary dumper 40.

Upon completion of the rotary dumping operation, vehicle 16 can exit the ECP dumper mode braking profile and can resume braking in accordance with S-4200 standard. In an example, completion of the dumping operation can be signaled to control unit 26 wirelessly or can be determined when control unit 26 is greater than a predetermined distance away from rotary dumper 40, e.g., as determined by the GPS coordinates of control unit 26 and rotary dumper 40. In an example, memory 36 of control unit 26 can store details each time the ECP dumper mode braking profile of operation has been started and exited, along with any irregularities that may have been encountered when executing the ECP dumper mode braking profile.

As can be seen, the ECP dumper mode braking profile can be used for braking vehicles 18 in a non-standard manner as described above. In an example, the transfer of a train configuration from one vehicle 16 to another locomotive is optional.

It is to be appreciated that, in the examples described above, during the rotary dumping operation, and unless described otherwise, during each act of each stepping or indexing of vehicle system 14, the brakes of the vehicles 18 in the above examples remain at the percent braking value(s) that the brakes were set prior to stepping or indexing.

While the foregoing examples have been described with reference to a rotary dumping operation, it is envisioned that the ECP dumper mode braking profile described above can be utilized in other applications of loading and/or unloading cargo to and/or from vehicles 18 of vehicle system 14. Accordingly, the foregoing examples describing the operation of the ECP dumper mode braking profile in connection with a dumping operation performed by a rotary dumper are not to be construed in a limiting sense.

Figure 9:
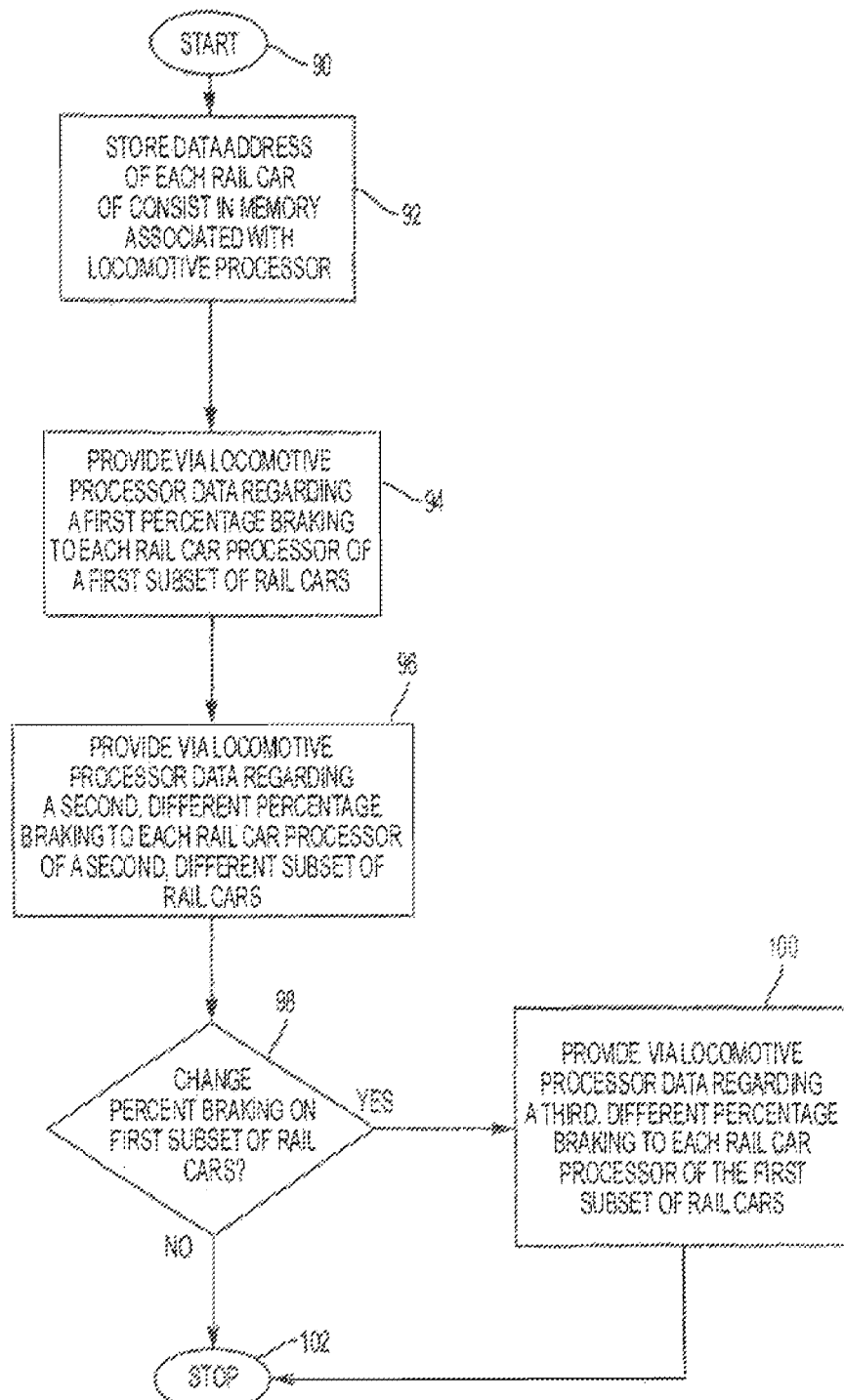
FIG. 9 is a flow diagram of an example method of a vehicle processor providing data regarding first and second percentages of braking to respective first and second subsets of vehicle processors and, optionally, providing data regarding a third percentage of braking to the first subset of vehicles.

With reference to FIG. 9 and with reference back to FIG. 1-7, in a general method (from the perspective of the vehicle 16 (or control unit 26) processor 34) of controlling the braking of a plurality of vehicles 18 of vehicle system 14 that includes processor 34 onboard vehicle 16 in communication with a processor 34 of each vehicle 18 of the vehicle system 14, the method initially advances from start step 90 to step 92 wherein a unique data address of each rail vehicle 18 processor 34 is stored in memory 36 associated with the vehicle 16 processor 34. The method advances to step 94 wherein the vehicle 16 processor 34 provides, via communication pathway 28, data regarding a first percentage of braking to each vehicle processor 34 of a first subset, e.g., 44-3, of vehicles 18 using the using the data address of each vehicle 18 of the first subset of the rail cars. The method advances to step 96 wherein the vehicle 16 processor 34 provides, via ECP trainline 28, data regarding a second percentage of braking to each processor 34 of a second subset, e.g., 44-4, of vehicles 18 using the using the data address of each vehicle 18 of the second subset of the vehicles.

The method then advances to decision step 98. If, in decision step 98, it is decided (NO) to NOT change the percentage braking on the first subset of vehicles, e.g., 44-3, the method advances to stop step 102.

If, however, in decision step 98, it is decided (YES) to change the percentage braking on the first subset of vehicles, e.g., 44-3, the method advances to step 100 wherein the vehicle 16 processor 34 provides data regarding a third percentage of braking to each vehicle 18 processor 34 of the first subset, e.g., 44-3, of the vehicles using the using the data address of each vehicle 18 of the first subset, e.g., 44-3, of the vehicles 18. The data regarding a third percentage of braking includes data for the brakes of the each vehicle of the first subset, e.g., 44-3, of the vehicles to be set to a third percentage of braking different from the first percentage of braking, the second percentages of braking, or both the first and second percentages of braking. This change in the percentage of braking of the first subset, e.g., 44-3, of the vehicles 18 from the first percentage of braking to the third percentage of braking can occur in response to stepped or indexed movement of vehicle system 14 in the manner discussed above. Following step 100, the method advances to stop step 102.

In the method of controlling braking of a plurality of vehicles 18 of vehicle system 14 disclosed in the flow diagram of FIG. 9 the vehicles of each subset of vehicles is unique. The data regarding a first percentage of braking includes data for the brakes of each vehicle of the first subset of the vehicles to be set to the first percentage of braking. The data regarding a second percentage of braking includes data for the brakes of each vehicle of the second subset of the vehicle to be set to the second percentage of braking different from the first percentage of braking. Implementation in time of the first percentage of braking of the first subset of the rail cars can at least partially overlap implementation in time of the second percentage of braking of the second subset of the vehicles, e.g., the first percentage of braking of the first subset of the vehicles and the second percentage of braking of the second subset of the vehicles occurs (at least partially) at the same time.

At least one of the subsets of vehicles can be continuous and/or discrete. At least one of the subsets of vehicles can be defined by a virtual zone. In response to disruption of communication between vehicle processors, the processor can maintain the percentage of braking of its rail vehicle. The vehicle(s) forming at least one of the first and second subsets of vehicles can be dynamically altered, e.g., as each subset of vehicles enters a virtual zone 46.

Figure 10:
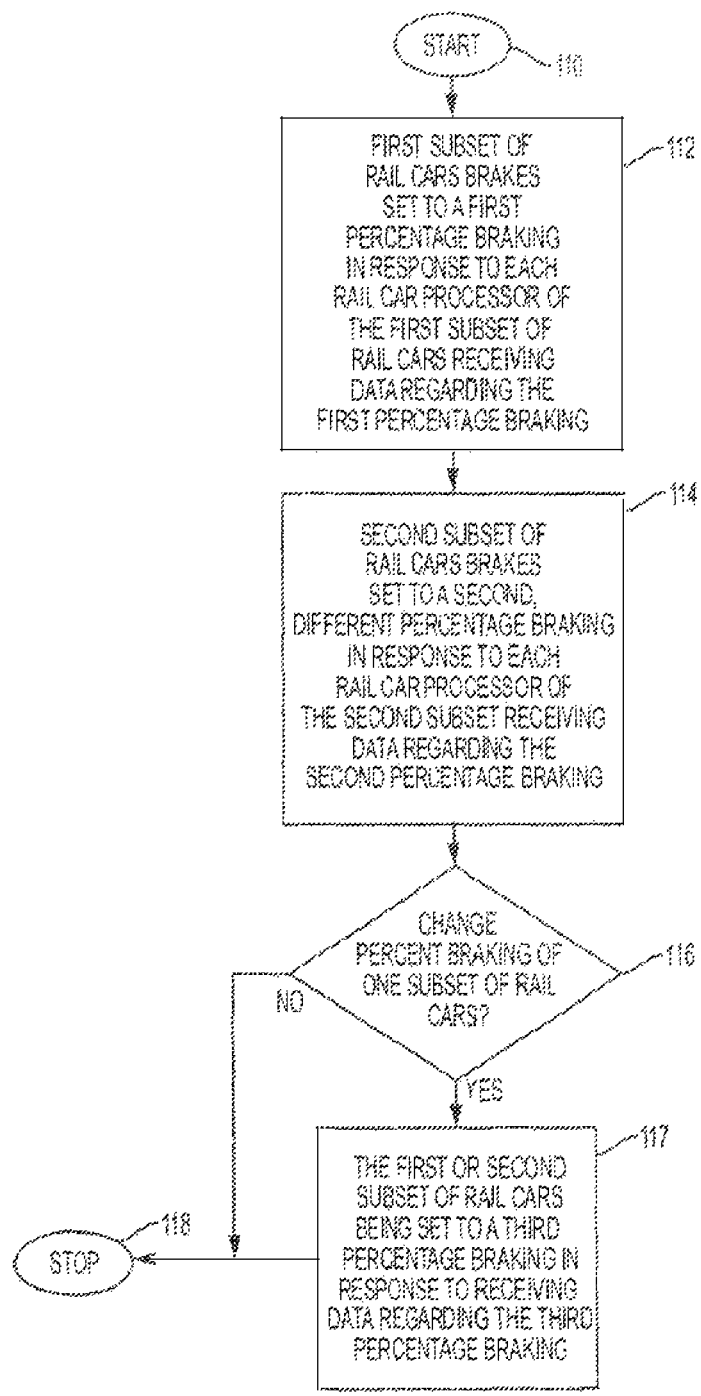
FIG. 10 is a flow diagram of an example method of first and second subsets of vehicles setting brakes to first and second, different percentages in response to each vehicle processor of the first and second subsets of vehicles receiving data regarding the first and second percentages of braking, respectively.

With reference to FIG. 10 and with reference back to FIG. 1-7, in a general method (from the perspective of vehicle 18

(or brake controllers 30) processors 34) of controlling braking of a plurality of vehicles 18 of a vehicle system 14, wherein each vehicle 18 includes a vehicle 18 processor 34 that is operative for controlling the brakes of the vehicle, the method advances from start step 110 to step 112. In step 112, in response to receiving at each vehicle 18 processor 34 of a first subset, e.g., 44-2, of the vehicles 18, via communication pathway 28, data regarding a first percentage of braking, the brakes of the vehicles 18 of the first subset of the vehicles being set to the first percentage braking. The method then advances to step 114, wherein, in response to receiving at each vehicle 18 processor 34 of a second subset, e.g., 44-3, of the vehicles data regarding a second percentage of braking, the brakes of the vehicles 18 of the second subset of the vehicles being set to the second percentage braking, wherein the vehicles of each subset of vehicles is unique. The method then advances to decision step 116.

Implementation of the first percentage of braking is desirably partially or fully concurrent (partially or fully at the same time) with implementation of the second percentage of braking.

If, in decision step 116, it is decided to NOT change the percent braking of as least one of the subsets of vehicles, the method advances to stop step 118.

If, however, in decision step 116, it is decided to change the percent braking of as least one of the subsets of vehicles, the method advances to step 117, wherein, in response to the first or second subset of the vehicles receiving data regarding a third percentage of braking, the brakes of the vehicles of the first or second subset of the vehicles being set to the third percentage braking. The method advances to stop step 118

The first subset of vehicles can include one or two or more vehicles and the second subset of vehicles can include one or two or more vehicles. At least one of the subsets of vehicles can be continuous and/or discrete.

The method can further include following at least one of steps 112 and 114, in response to disruption of a vehicle processor receiving data, the rail car processor maintaining the percentage braking of its vehicle.

The method can further include dynamically altering the vehicle(s) and/or the braking profiles of the vehicle(s) forming at least one of the first and second subsets of vehicles.

Figure 11:
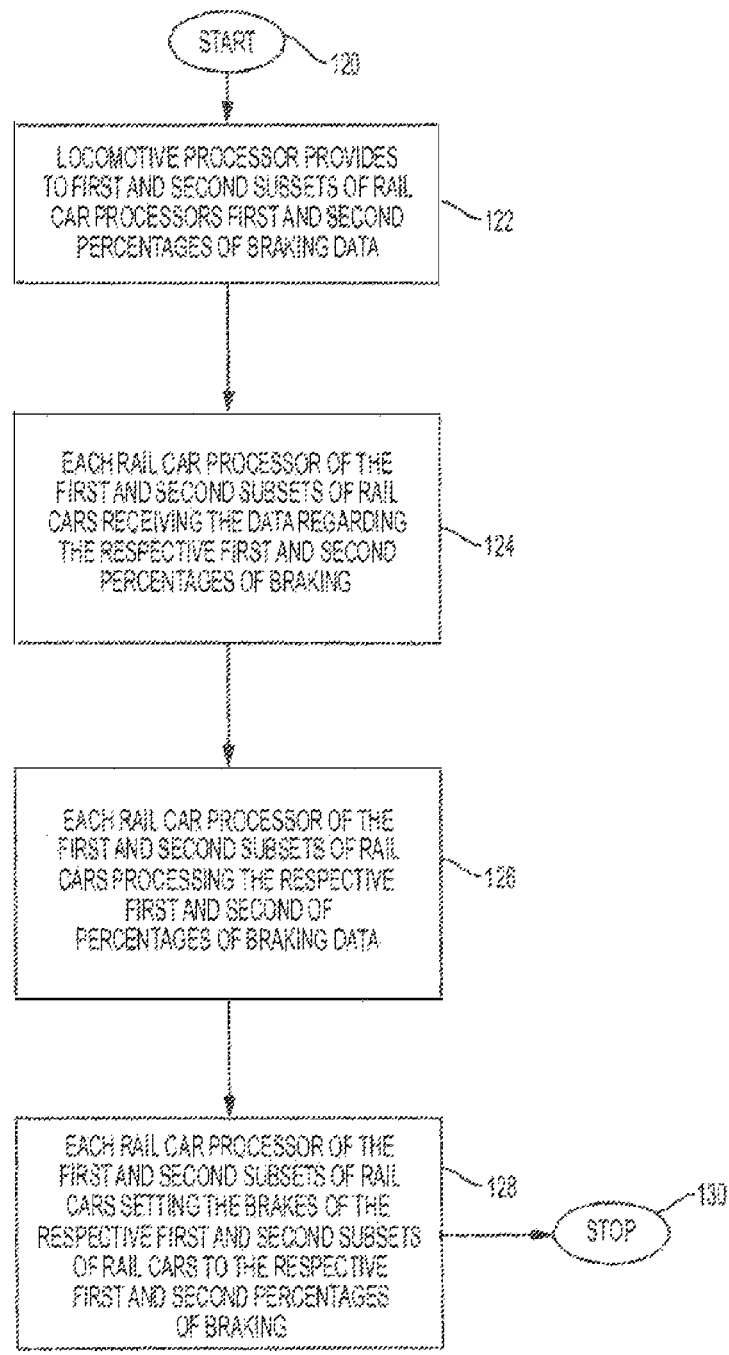
FIG. 11 is a flow diagram of an example method of a vehicle processor providing to processors of first and second subsets of vehicles respective data regarding first and second percentages of braking and the processors of the vehicles processing the data and setting the brakes of the first and second subsets of vehicles to the respective first and second percentages of braking.

With reference to FIG. 11 and with reference back to FIG. 1-7, in a general method (from the perspective of the interaction of processors 34 of the propulsion-generating vehicle (PGV) and two-subsets of non-propulsion-generating vehicles (NPGV)) the method advances from start step 120 to step 122. In step 122, the PGV processor provides to each NPGV processor of first and second subsets of vehicles data regarding respective first and second percentages of braking. In step 124, each NPGV processor of the first subset of vehicles receives the data regarding the first percentage of braking and each NPGV processor of the second subset of vehicles receives the data regarding the second percentage of braking. In step 126, each NPGV processor of the first subset of vehicles processes the data regarding the first percentage of braking and each NPGV processor of the second subset of vehicles processes the data regarding the second percentage of braking. In step 128, in response to the processing by the processors of the first and second subsets of vehicles, each NPGV processor of the first subset of vehicles sets the brakes of the first subset of vehicles to the first percentage of braking and each NPGV processor of the second subset of vehicles sets the brakes of the second subset of vehicles to the second, different percentage of braking. The method then advances to stop step 130.

The first and second percentages of braking can be different. The first subset of vehicles can include one or two or more vehicles and the second subset of vehicles can include one or two or more vehicles. At least one of the subsets of vehicles can be continuous and/or discrete.

Finally the method can further include in response to disruption in a communication path between the PGV processor and at least one NPGV processor, the NPGV processor maintaining the percentage braking of its vehicle.

As can be seen, disclosed herein is a method of controlling braking one or more vehicles in a vehicle system positioned for operation during an act of unloading/loading of cargo, wherein the vehicle system comprises a designated head-end and a tail-end, and wherein each of the one or more vehicles is equipped with an electronic braking system in a communication link to a central control (control unit 26) via a communication network spanning across the vehicle system. The method includes the steps of: setting a dynamic unloading/loading braking profile on at least one electronic braking system on at least one vehicle; and performing the act of unloading/loading of the cargo from one or more vehicles in the vehicle system while controlling the braking on at least one of the vehicles in the vehicle system via the dynamic unloading/loading braking profile.

The dynamic unloading/loading braking profile can allow the electronic braking systems on two or more of the vehicles in the vehicle system to be set to different braking values. In an example, the braking values set by the electronic braking systems on two or more of the vehicles can be different by an amount equal to or greater than 5% of the braking values, wherein the % braking value on each vehicle can be varied in each vehicle independent of each other vehicle in 1% increments between 0% braking value, or no braking (full brake release), 100% braking value (i.e., maximum service level braking), and 120% braking (i.e., emergency braking). The method can include storing information about the vehicle system at a first PGV connected to either the head-end or the tail-end of the vehicle system.

The method can include positioning the vehicle system in a designated area for unloading/loading prior to start of the unloading/loading operation from the one or more NPGVs in the vehicle system.

The method can include transferring the information about the vehicle system between the first PGV and a second PGV that will be coupled to the vehicle system in lieu of the first PGV; and connecting the second PGV to either the head-end or the tail-end of the vehicle system, wherein the second PGV is now configured to control the electronic braking systems in the one or more NPGVs in the vehicle system.

The method can include remotely controlling at least one of movement of the vehicle system and/or the electronic braking system on at least one NPGV of the vehicle system in coordination with operation of an automated movement system situated in proximity to the vehicle system via the first PGV or the second PGV.

The method can include allowing the electronic braking system in each of the NPGVs to continue to operate in the unloading/loading braking profile upon detecting a disruption in the communication network.

The method can include allowing the electronic braking system in each of the NPGVs in the vehicle system to go to a full release condition (0% braking) upon detecting a disruption in the communication network.

The method can include altering configuration of the electronic braking system in each NPGV in the vehicle system to the dynamic unloading/loading braking profile.

The method can include selecting one or more groups of NPGVs in the vehicle system, and setting one or more dynamic unloading/loading operation braking profiles for the one or more groups of NPGVs in the vehicle system.

The method can include selecting a continuous (or discrete) group of NPGVs from the vehicle system as the one or more groups of the NPGVs in the vehicle system.

The method can include dynamically altering at least one of composition of the NPGVs within the one or more groups of NPGVs and/or the unloading/loading braking profiles for one or more NPGVs within each of the one or more groups of the NPGVs. In an example, the dynamically altering of the composition of the NPGVs and/or the unloading/loading braking profiles for one or more NPGVs within each of the one or more groups of the NPGVs can be based on the progression of the vehicle system through a loading/unloading process, upon changes to the loading/unloading system capability (for example, the indexer or rotary dumper operating at less than optimum performance), upon changes to the environment (for example, weather conditions including moisture, temperature, wind, etc.), and/or upon any other external change that can impact the loading/unloading process.

The method can include synchronizing movement of the vehicle system and the unloading/loading movement of an automated unloading/loading system.

The method can include synchronizing the movement of the vehicle system based on braking status of the one or more NPGVs in the vehicle system.

The method can include configuring a standard/uniform braking profile in the electronic braking system in each of the NPGVs in the vehicle system upon completion of the act of unloading/loading of the vehicle system.

The method can include positioning of the vehicle system in relation to an automated unloading/loading system by one of the first PGV or the second PGV.

The method can include logging status of all activity between positioning of the vehicle system prior to the unloading/loading and completion of the unloading/loading.

Also disclosed is a computer readable medium including program instructions for controlling the braking of one or more NPGVs in a vehicle system positioned for an act of unloading/loading of cargo, wherein execution of the program instructions by one or more processors of a computer system causes the one or more processors to carry out the steps of: setting a dynamic unloading/loading braking profile on at least one electronic braking system on at least one NPGV; and in response to the act of unloading/loading of the cargo from one or more NPGVs in the vehicle system, controlling the braking on at least one of the NPGVs in the vehicle system via the dynamic unloading/loading braking profile.

The computer readable medium can further include program instructions to carry out the step of storing information about the vehicle system at a first PGV connected to either the head-end or the tail-end of the vehicle system.

The computer readable medium can further include program instructions to carry out at least one of the steps of: controlling the electronic braking system in at least one NPGV in the vehicle system in coordination with operation of an automated movement system situated in proximity to the vehicle system; allowing the electronic braking system in each of the cars to continue to operate in the unloading/loading braking profile upon detecting a disruption in the communication network; and allowing the electronic braking system in each of the NPGVs in the vehicle system to go to full release condition (0% braking) upon detecting a disruption in the communication network.

The computer readable medium can further include program instructions to carry out the steps of: selecting a first group of NPGVs from the vehicle system and setting a first dynamic unloading/loading operation braking profile for the first group; and selecting a second group of NPGVs different from the first group of NPGVs and setting a second dynamic unloading/loading braking profile for the second group, wherein the second dynamic unloading/loading braking profile is different from the first dynamic unloading/loading braking profile.

As used herein, dynamic unloading/loading braking profile means that the brakes of at least one NPGV of the vehicle system are able to be set dynamically to a percent braking level different than the brakes of at least one other NPGV of the vehicle system. Stated differently, dynamic unloading/loading braking profile means that the percent braking level of each NPGV can be set and controlled or varied independently of the percent braking level of each other car.

The computer readable medium can further include program instructions to carry out at least one of the steps of: selecting a continuous (or discrete) group of NPGVs from the vehicle system for the creation of either the first group or the second group; and dynamically altering composition of the NPGVs in at least one of the first group or the second group of NPGVs.

The computer readable medium can further include program instructions to carry out at least one of the steps of: configuring a standard braking profile in the electronic braking system in each of the NPGVs in the vehicle system upon completion of the act of unloading/loading of the vehicle system; and logging status of activity between positioning of the vehicle system prior to the unloading/loading and completion of the unloading/loading.

Also disclosed herein is a system for controlling braking of one or more NPGVs in a vehicle system positioned for an act of unloading/loading of cargo, each of the one or more NPGVs equipped with an electronic braking system and a link to a central control via a communication network spanning the vehicle system, the system comprising: a programmable electronic braking system having an initial braking profile in each of the NPGVs in the vehicle system, the programmable electronic braking system configurable to alter braking profiles that are designated for the programmable electronic braking systems to adhere during operation; a communication network linking each of the programmable electronic braking systems in each of the NPGVs; and a control unit in communication with each of the programmable electronic braking systems via the electronic communication network, the control unit configurable to perform at least one or more of the following tasks: configure one or more alternate braking profiles in lieu of the initial braking profile in one or more of the programmable electronic braking system in the vehicle system; and monitor functioning of the programmable electronic braking system in each of the NPGVs.

Also disclosed herein is a method of controlling braking of a plurality of NPGVs of a vehicle system that includes a processor onboard a PGV of the vehicle system in communication with a processor of each NPGV of the vehicle system. The method comprises: (a) storing in a memory associated with the PGV processor a unique data address of each NPGV processor; (b) providing via the PGV processor data regarding a first percentage of braking to each NPGV processor of a first subset of the NPGVs using the using the data address of each NPGV of the first subset of the NPGVs; and (c) providing via the PGV processor data regarding a second percentage of braking to each NPGV processor of a second subset of the NPGVs using the using the data address of each NPGV of the second subset of the NPGVs. The NPGVs of each subset of NPGVs is unique. The data regarding the first percentage of braking includes data for the brakes of each NPGV of the first subset of the NPGVs to be set to a first percentage of braking. The data regarding the second percentage of braking includes data for the brakes of each NPGV of the second subset of the NPGVs to be set to a second percentage of braking different from the first percentage of braking. Implementation in time of the first percentage of braking of the first subset of the NPGVs at least partially overlaps implementation in time of the second percentage of braking of the second subset of the NPGVs, e.g., the first percentage of braking of the first subset of the NPGVs and the second percentage of braking of the second subset of the NPGVs occurs at least partially at the same time.

The first subset of NPGVs can include one or two or more NPGVs and the second subset of NPGVs can include one or two or more NPGVs. At least one of the subsets of NPGVs can be continuous and/or discrete.

The method can further include: (d), following steps (b) and (c), providing via the PGV processor data regarding a third percentage of braking to each NPGV processor of the first subset of the NPGVs using the using the data address of each NPGV of the first subset of the NPGVs. The data regarding a third percentage of braking includes data for the brakes of the each NPGV of the first subset of the NPGVs to be set to a third percentage of braking different from the first percentage of braking, the second percentages of braking, or both the first and second percentages of braking.

At least one of the subsets of NPGVs can be defined by a virtual zone.

The method can further include, in response to disruption of communication between a NPGV processor and the PGV processor, the NPGV processor maintaining the percentage of braking of its NPGV.

The method can further include dynamically altering the NPGV(s) and/or the braking profiles of the NPGV(s) forming at least one of the first and second subsets of NPGVs.

Also disclosed herein is a method of controlling braking of a plurality of NPGVs of a vehicle system, wherein each NPGV includes a NPGV processor that is operative for controlling the brakes of the NPGV. The method comprises: (a) in response to receiving at each NPGV processor of a first subset of the NPGVs data regarding a first percentage of braking, the brakes of the NPGVs of the first subset of the NPGVs being set to the first percentage braking; and (b) in response to receiving at each NPGV processor of a second subset of the NPGVs data regarding a second percentage of braking, the brakes of the NPGVs of the second subset of the NPGVs being set to the second percentage braking, wherein the NPGVs of each subset of NPGVs is unique.

Implementation of the first percentage of braking is desirably partially or fully concurrent with implementation of the second percentage of braking.

In response to the first or second subset of the NPGVs receiving data regarding a third percentage of braking, the brakes of the NPGVs of the first or second subset of the NPGVs being set to the third percentage braking. The first subset of NPGVs can include one or two or more NPGVs and the second subset of NPGVs can include one or two or more NPGVs. At least one of the subsets of NPGVs can be continuous and/or discrete.

The method can further include following at least one of steps (a) and (b), in response to disruption of a NPGV processor receiving data, the NPGV processor maintaining the percentage braking of its NPGV.

The method can further include dynamically altering the NPGV(s) and/or the braking profiles of the NPGV(s) forming at least one of the first and second subsets of NPGVs.

Also disclosed herein is a method comprising: (a) providing via a PGV processor to each NPGV processor of first and second subsets of NPGVs data regarding respective first and second percentages of braking; (b) receiving at each NPGV processor of the first subset of NPGVs the data regarding the first percentage of braking; (c) receiving at each NPGV processor of the second subset of NPGVs the data regarding the second percentage of braking; (d) processing by each NPGV processor of the first subset of NPGVs the data regarding the first percentage of braking; (e) processing by each NPGV processor of the second subset of NPGVs the data regarding the second percentage of braking; (f) setting via each NPGV processor of the first subset of NPGVs the brakes of the first subset of NPGVs to the first percentage of braking; and (g) setting via each NPGV processor of the second subset of NPGVs the brakes of the second subset of NPGVs to the second percentage of braking, wherein the first and second percentages of braking are different.

The first subset of NPGVs can include one or two or more NPGVs and the second subset of NPGVs can include one or two or more NPGVs. At least one of the subsets of NPGVs can be continuous and/or discrete.

The method can further include in response to disruption in a communication path between the PGV processor and at least one NPGV processor, the NPGV processor maintaining the percentage braking of its NPGV.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method comprising:
   determining a first dynamic braking profile for a first electronic braking system of a first non-propulsion-generating vehicle in a vehicle system;
   performing one or more of unloading cargo from or loading the cargo onto the first non-propulsion-generating vehicle in the vehicle system; and
   controlling braking of a second electronic braking system of a second non-propulsion-generating vehicle in the vehicle system using the first dynamic braking profile of the first non-propulsion-generating vehicle while the one or more of the unloading of the cargo from or the loading of the cargo onto the first non-propulsion-generating vehicle occurs.

2. The method of claim 1, further comprising:
   communicating information about the vehicle system between a first propulsion-generating vehicle and a second propulsion-generating vehicle that will be coupled to the vehicle system in lieu of the first propulsion-generating vehicle;

connecting the second propulsion-generating vehicle to the vehicle system; and controlling the second electronic braking system in the second non-propulsion-generating vehicle in the vehicle system using the first dynamic braking profile of the first non-propulsion-generating vehicle.

3. The method of claim 1, further comprising remotely controlling the second electronic braking system on the second non-propulsion-generating vehicle of the vehicle system in coordination with operation of an automated movement system situated in proximity to the vehicle system.

4. The method of claim 1, further comprising continuing to operate the second electronic braking system in the second non-propulsion-generating vehicle to continue to operate in the first dynamic braking profile upon detecting a disruption in a communication network between a secondary controller of the second non-propulsion-generating vehicle and a primary controller of the first non-propulsion-generating vehicle.

5. The method of claim 1, further comprising switching the second electronic braking system in the second non-propulsion-generating vehicle in the vehicle system to a release condition upon detecting a disruption in a communication network between a secondary controller of the second non-propulsion-generating vehicle and a primary controller of the first non-propulsion-generating vehicle.

6. The method of claim 1, further comprising altering configuration of the second electronic braking system in the second non-propulsion-generating vehicle in the vehicle system to the first dynamic braking profile.

7. The method of claim 1, wherein the vehicle system includes one or more additional non-propulsion-generating vehicles, and further comprising:

selecting groups of the first, the second, and the one or more additional non-propulsion-generating vehicles in the vehicle system; and determining the first dynamic braking profile for a first group of the groups and a different, second dynamic braking profile for a different, second group of the groups.

8. The method of claim 7, further comprising selecting a discrete set of the first, the second, and the one or more additional non-propulsion-generating vehicles for the first group.

9. The method of claim 8, further comprising dynamically altering which of the first, the second, and the one or more additional non-propulsion-generating vehicles are in the first group or the second group during movement of the vehicle system.

10. The method of claim 8, further comprising dynamically altering the first dynamic braking profile or the second dynamic braking profile during movement of the vehicle system.

11. A system comprising:

a control unit configured to determine a first dynamic braking profile for a first electronic braking system of a first non-propulsion-generating vehicle in a vehicle system;

the control unit configured to remotely control a first brake controller of the first non-propulsion-generating vehicle in the vehicle system during one or more of unloading cargo from or loading the cargo onto the first non-propulsion-generating vehicle in the vehicle system; and controlling braking on a second non-propulsion-generating in the vehicle system using the first dynamic braking profile of the first non-propulsion-generating vehicle while the one or more of the unloading of the cargo from or the loading of the cargo onto the first non-propulsion-generating vehicle occurs.

12. The system of claim 11, wherein the vehicle system includes one or more additional non-propulsion-generating vehicles, and the control unit is configured to:

select groups of the first, the second, and the one or more additional non-propulsion-generating vehicles in the vehicle system; and determine a first dynamic braking profile for a first group of the groups of non-propulsion-generating vehicles and a different, second dynamic braking profile for a different, second group of the groups of non-propulsion-generating vehicles in the vehicle system.

13. The system of claim 12, wherein the control unit is configured to select a discrete set of the non-propulsion-generating vehicles for a first group of the groups of non-propulsion-generating vehicles.

14. The system of claim 12, wherein the control unit is configured to dynamically alter which of the non-propulsion-generating vehicles are in the first group or the second group during movement of the vehicle system.

15. The system of claim 12, wherein the control unit is configured to dynamically alter the first dynamic braking profile or the second dynamic braking profile during movement of the vehicle system.

16. A system comprising:

a control unit configured to communicate with brake controllers disposed onboard first, second, and one or more additional non-propulsion-generating vehicles of a vehicle system formed from the first, the second or the one or more additional non-propulsion-generating vehicles, each of the brake controllers configured to control an amount of braking imparted by the first, the second, or the one or more additional non-propulsion-generating vehicles in the vehicle system, the controller unit configured to select different groups of the first, the second or the one or more additional non-propulsion-generating vehicles and to determine a different braking profile for each of the different groups, the braking profile for each of the groups indicating the amount of braking to be imparted by the vehicle or the vehicles for the corresponding group.

17. The system of claim 16, wherein the control unit is configured to change which of the non-propulsion-generating vehicles are included in at least one of the groups during braking by at least one of the first, the second or the one or more additional non-propulsion-generating vehicles.

18. The system of claim 16, wherein the control unit is configured to determine which of the non-propulsion-generating vehicles are included in at least one of the groups based on which of the first, the second and the one or more additional non-propulsion-generating vehicles are located in a zone.

19. The system of claim 16, wherein the control unit is configured to select two or more of the non-propulsion-generating vehicles that are adjacent to each other in the vehicle system for inclusion in at least one of the groups.

20. The system of claim 16, wherein the control unit is configured to select at least the first and the second non-propulsion-generating vehicles of the first, the second or the one or more additional non-propulsion-generating vehicles for inclusion in a first group of the groups, the first and the second non-propulsion-generating vehicles separated from each other by a third non-propulsion-generating vehicle that is not included in the first group.

\* \* \* \* \*